(12) United States Patent
Yang

(10) Patent No.: US 8,406,946 B2
(45) Date of Patent: Mar. 26, 2013

(54) SINGLE-POWERED MULTI-CVT DIFFERENTIAL SYSTEM WITH STABILIZING DEVICE

(76) Inventor: Tai-Her Yang, Dzan-Hwa (TW)

( * ) Notice: Subject to any disclaimer, the term of this patent is extended or adjusted under 35 U.S.C. 154(b) by 235 days.

(21) Appl. No.: 12/659,916

(22) Filed: Mar. 25, 2010

(65) Prior Publication Data

US 2011/0238243 A1 Sep. 29, 2011

(51) Int. Cl.
*B60W 10/08* (2006.01)
(52) U.S. Cl. .............................. 701/22; 477/3
(58) Field of Classification Search .............. 701/22, 701/66, 67, 51, 54; 477/5, 3, 37, 6, 166, 477/4, 31, 34, 35; 475/275, 216, 208; 476/46; 302/3; 180/365; 903/930, 945
See application file for complete search history.

(56) References Cited

U.S. PATENT DOCUMENTS

| | | | |
|---|---|---|---|
| 6,709,364 B2 * | 3/2004 | Eguchi et al. | 477/174 |
| 7,347,802 B2 * | 3/2008 | Tatara et al. | 477/5 |
| 7,566,288 B2 * | 7/2009 | Tabata et al. | 477/4 |
| 7,722,497 B2 * | 5/2010 | Tabata et al. | 477/3 |
| 7,955,215 B2 * | 6/2011 | Shibata | 477/3 |
| 2005/0245350 A1 * | 11/2005 | Tabata et al. | 477/34 |

* cited by examiner

*Primary Examiner* — Thomas Black
*Assistant Examiner* — Marthe Marc-Coleman
(74) *Attorney, Agent, or Firm* — Bacon & Thomas, PLLC

(57) ABSTRACT

The present invention relates to single power source installed at a common load, for individually installing the CVT between the output shaft of the single power source or further through two or more output shafts of the transmission and the individually driven load, for randomly changing the speed ratio to match the speed differential operation between two loads driven by the single power source, in which the stabilizing device constituted by torque limited coupling device with sliding damping during sliding is installed between the loads individually driven by the two CVTs.

20 Claims, 12 Drawing Sheets

SINGLE-POWERED MULTI-CVT DIFFERENTIAL SYSTEM WITH STABILIZING DEVICE

BACKGROUND OF THE INVENTION (a) Field of the Invention

The present invention relates to a single power source installed at the common load, which is driven by electric motor, or internal combustion engine, or external combustion engine, or spring force, or hydraulic power, or pneumatic power, or flywheel power, or human power, or animal power, or wind power, for individually installing CVT between the output shaft of the single power source, or further through two or more output shafts of the transmission, and the individually driven load, for randomly changing the speed ratio to match the differential speed operation between two loads driven by the single power source, in which the stabilizing device constituted by the torque limited coupling device with sliding damping during sliding is installed between the loads individually driven by the two CVTs, the stabilizing device synchronously operates when the torque transmitted between the two loads operates within the limited torque range, and the stabilizing device differentially operates to produce sliding damping to stabilize the operation of the drive system when the torque transmitted between the two loads exceeds the limited torque range.

(b) Description of the Prior Art

Traditionally, when two or more loads installed at the common load are driven through speed differential drive by a single power, the speed differential function is often achieved by differential wheel group, which has shortcomings including transmission efficiency loss, space used, and the weight.

SUMMARY OF THE INVENTION

The present invention relates to a single power source installed at the common load, which is driven by electric motor, or internal combustion engine, or external combustion engine, or spring force, or hydraulic power, or pneumatic power, or flywheel power, or human power, or animal power, or wind power, for individually installing CVT between the output shaft of the single power source, or further through two or more output shafts of the transmission, and the individually driven load, for randomly changing the speed ratio to match the speed differential operation between two loads driven by the single power source, and the stabilizing device constituted by the torque limited coupling device with sliding damping during sliding is installed between two loads individually driven by the two CVTs, during driving operation, if the loads individually driven by the two CVTs vary, or if the response time of the clutch unit at the loads individually driven by the two CVTs is slower, or if the two clutch units operate unstably because of the synchronous response time difference thereof, the stabilizing device installed between the loads operates to stabilize the system.

DESCRIPTION OF MAIN COMPONENT SYMBOLS

CL100, CL200, CL300, CL400, CL500, CL600: Clutch unit
CVT100, CVT200, CVT300, CVT400, CVT500, CVT600: Continuous variable transmission
L100: Common load body
MI100: User interface
P100: Single power source
SDT100, SDT200, SDT300: Stabilizing device
T100, T101, T200, T300, T400, T500, T600: Transmission
W100, W200, W300, W400, W500, W600: Wheel group

DETAILED DESCRIPTION OF THE PREFERRED EMBODIMENTS

Traditionally, when two or more loads installed at the common load are driven through speed differential drive by a single power, the speed differential function is often achieved by differential wheel group, which has shortcomings including transmission efficiency loss, space used, and the weight.

The present invention relates to a single power source installed at the common load, which is driven by electric motor, or internal combustion engine, or external combustion engine, or spring force, or hydraulic power, or pneumatic power, or flywheel power, or human power, or animal power, or wind power, for individually installing CVT between the output shaft of the single power source, or further through two or more output shafts of the transmission, and the individually driven load, for randomly changing the speed ratio to match the differential speed operation between two loads driven by the single power source, in which the stabilizing device constituted by the torque limited coupling device with sliding damping during sliding is installed between the loads individually driven by the two CVTs, the stabilizing device synchronously operates when the torque transmitted between the two loads operates within the limited torque range, and the stabilizing device differentially operates to produce sliding damping to stabilize the operation of the drive system when the torque transmitted between the two loads exceeds the limited torque range.

The CVT in the present invention is a continuous variable transmission, which can automatically change the speed ratio with the load state, or change the speed ratio in receiving external manipulation, including a variety of types, such as rubber belt type, metal belt type, and chain type CVT, or the electronic continuous variable transmission (ECVT), or the friction disk type, or the conventional non-coaxial continuous variable transmission.

The common load in the present invention refers to a common load, which is further installed with the engine power system, related user interface unit, and the optional non-power wheel not driven by the single power source (P100), for commonly bearing the common load body (L100) with the power wheel.

The various embodiments are described as following.

Figure 1:
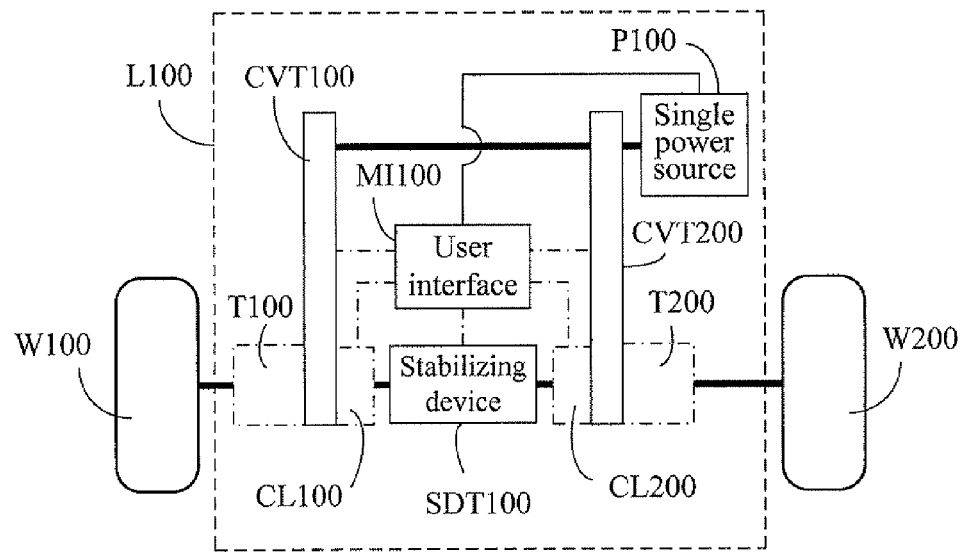
FIG. 1 is a schematic view showing the first embodiment of the speed differential operation system of the present invention.

FIG. 1 is a schematic view showing the first embodiment of the speed differential operation system of the present invention, in which between the rotary output side of the single power source (P100) and the wheel group (W100) and the wheel group (W200) respectively installed at two loads at two sides of the common load body (L100) is individually installed with a continuous variable transmission and installed with a stabilizing device (SDT100).

As shown in FIG. 1, the single power source (P100) is through the continuous variable transmission (CVT100) and the transmission (T100) installed at the common load body (L100) to drive the wheel group (W100) installed at the load, and the same output side of the single power source (P100) is through the continuous variable transmission (CVT200) and the transmission (T200) to drive the wheel group (W200) installed at the load, whereas when the wheel group (W100) and the wheel group (W200) at the load are driven at differential speed, the continuous variable transmission (CVT100) and the continuous variable transmission (CVT200) automatically regulate the speed ratio with the load variation, and the stabilizing device (STD100) operates to match the speed differential operation drive between the wheel group (W100) and the wheel group (W200) at the load, in which:

single power source (P100): constituted by the power source with rotary output kinetic energy, such as internal combustion engine, external combustion engine, spring force source, hydraulic power source, pneumatic power source, flywheel power source, or human power, or animal power, wind power source, and/or constituted by the electricity driven rotary motor, which are AC or DC, brushless or brush, synchronous or non-synchronous, internal or external rotation type; and equipped with the related control unit and the energy supply and/or storage unit;

continuous variable transmissions (CVT100), (CVT200): related to continuous variable transmissions, which can automatically change the speed ratio according to the load state, or change the speed ratio in receiving external manipulation, including a variety of types, such as rubber belt type, metal belt type, and chain type CVT, or the electronic continuous variable transmission (ECVT), or the friction disk type, or the conventional non-coaxial continuous variable transmission;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT100) and (CVT200), if unstable operation is caused by the varied load at individual load side during driving operation, the stabilizing device (SDT100) installed between the loads operates to stabilize the system;

transmissions (T100), (T200): related to fixed speed ratio, variable speed ratio, or stepless speed variable transmission, which is constituted by mechanical gear unit, sprocket unit, pulley unit, or linkage group; and the transmission is selectable as needed; and user interface (MI100): related to linear analog or digital, or both mixed control device, constituted by the operating mechanism, and/or the electric machine, and/or the solid state circuit, for controlling the operation of the single power source (P100), and/or controlling the operations of the continuous variable transmission (CVT100) and/or the continuous variable transmission (CVT200).

Through the operation of the above device, if the common load body (L100) is driven for operation, and the wheel group (W100) and the wheel group (W200) installed at the load perform speed differential operation, the continuous variable transmission (CVT100) and the continuous variable transmission (CVT200) individually regulate speed ratio according to the load variation of the wheel group (W100) and the wheel group (W200) installed at the load, so as to facilitate the speed differential operation drive between the wheel group (W100) and the wheel group (W200) at the load.

In addition, for the embodiment shown in FIG. 1, except for directly driving the load through the continuous variable transmission, or through the continuous variable transmission and the transmission, a clutch unit is further installed at the output side of the continuous variable transmission individually arranged between the individual wheel group and the single power source (P100), including: the clutch unit (CL100) is additionally installed at the output side of the continuous variable transmission (CVT100), and/or the clutch unit (CL200) is additionally installed at the output side of the continuous variable transmission (CVT200), in which:

clutch units (CL100), (CL200): related to the clutch device or structure, controlled by manpower or centrifugal force, or through the control of user interface (MI100), with the function of linking transmission or cutting separation, which is driven by electricity, and/or magnetic power, and/or machine power, and/or gas pressure, and/or liquid pressure, and which has the rotary input side and the rotary output side;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL100) and (CL200) individually driven by the continuous variable transmissions (CVT100) and (CVT200), during driving operation, if the load at individual load side varies, or if the response time of the clutch units (CL100)

and (CL200) at the loads individually driven by the continuous variable transmissions (CVT100) and (CVT200) is slower, or if the clutch units (CL100) and (CL200) operate unstably because of the synchronous response time difference thereof, the stabilizing device (SDT100) installed between the loads of the clutch units (CL100) and (CL200) operates to stabilize the system.

Figure 2:
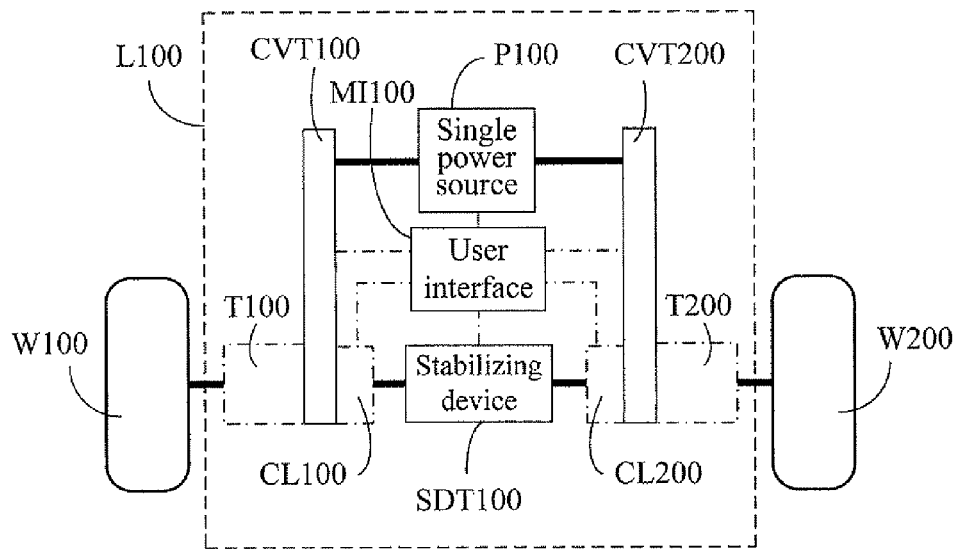
FIG. 2 is a schematic view showing the second embodiment of the speed differential operation drive system of the present invention.

FIG. 2 is a schematic view showing the second embodiment of the speed differential operation drive system of the present invention, in which between the rotary output sides at two sides of the single power source (P100) and the wheel group (W100) and the wheel group (W200) respectively installed at two loads at two sides of the common load body (L100) is individually installed with a continuous variable transmission and installed with a stabilizing device (SDT100) to constitute the speed differential operation drive system.

As shown in FIG. 2, the speed differential operation drive system of the present invention is constituted by the continuous variable transmission individually installed between the rotary output sides at two sides of the single power source (P100) and the wheel group (W100) and the wheel group (W200) respectively installed at two loads at two sides of the common load body (L100), and through the operation of the stabilizing device (SDT100), in which:

single power source (P100): constituted by the power source with rotary output kinetic energy, such as internal combustion engine, external combustion engine, spring force source, hydraulic power source, pneumatic power source, flywheel power source, or human power, or animal power, wind power source, and/or constituted by the electricity driven rotary motor, which are AC or DC, brushless or brush, synchronous or non-synchronous, internal or external rotation type; and equipped with the related control unit and the energy supply and/or storage unit;

continuous variable transmissions (CVT100), (CVT200): related to continuous variable transmissions, which can automatically change the speed ratio according to the load state, or change the speed ratio in receiving external manipulation, including a variety of types, such as rubber belt type, metal belt type, and chain type CVT, or the electronic continuous variable transmission (ECVT), or the friction disk type, or the conventional non-coaxial continuous variable transmission;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT100) and (CVT200), if unstable operation is caused by the varied load at individual load side during driving operation, the stabilizing device (SDT100) installed between the loads operates to stabilize the system;

transmissions (T100), (T200): related to fixed speed ratio, variable speed ratio, or stepless speed variable transmission, which is constituted by mechanical gear unit, sprocket unit, pulley unit, or linkage group; and the transmission is selectable as needed; and user interface (MI100): related to linear analog or digital, or both mixed control device, constituted by the operating mechanism, and/or the electric machine, and/or the solid state circuit, for controlling the operation of the single power source (P100), and/or controlling the operations of the continuous variable transmission (CVT100) and/or the continuous variable transmission (CVT200).

Through the operation of the above device, if the common load body (L100) is driven for operation by the single power source (P100), and the wheel group (W100) and the wheel group (W200) installed at the load perform speed differential operation, the continuous variable transmission (CVT100) and the continuous variable transmission (CVT200) individually regulate speed ratio according to the load variation of the wheel group (W100) and the wheel group (W200) installed at the load, so as to facilitate the speed differential operation drive between the wheel group (W100) and the wheel group (W200) at the load.

In addition, for the embodiment shown in FIG. 2, except for directly driving the load through the continuous variable transmission, or through the continuous variable transmission and the transmission, a clutch unit is further installed at the output side of the continuous variable transmission individually arranged between the individual wheel group and the single power source (P100), including: the clutch unit (CL100) is additionally installed at the output side of the continuous variable transmission (CVT100), and/or the clutch unit (CL200) is additionally installed at the output side of the continuous variable transmission (CVT200), in which:

clutch units (CL100), (CL200): related to the clutch device or structure, controlled by manpower or centrifugal force, or through the control of user interface (MI100), with the function of linking transmission or cutting separation, which is driven by electricity, and/or magnetic power, and/or machine power, and/or gas pressure, and/or liquid pressure, and which has the rotary input side and the rotary output side;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL100) and (CL200) individually driven by the continuous variable transmissions (CVT100) and (CVT200), during driving operation, if the load at individual load side varies, or if the response time of the clutch units (CL100) and (CL200) at the loads individually driven by the continuous variable transmissions (CVT100) and (CVT200) is slower, or if the clutch units (CL100) and (CL200) operate unstably because of the synchronous response time difference thereof, the stabilizing device (SDT100) installed between the loads of the clutch units (CL100) and (CL200) operates to stabilize the system.

Figure 3:
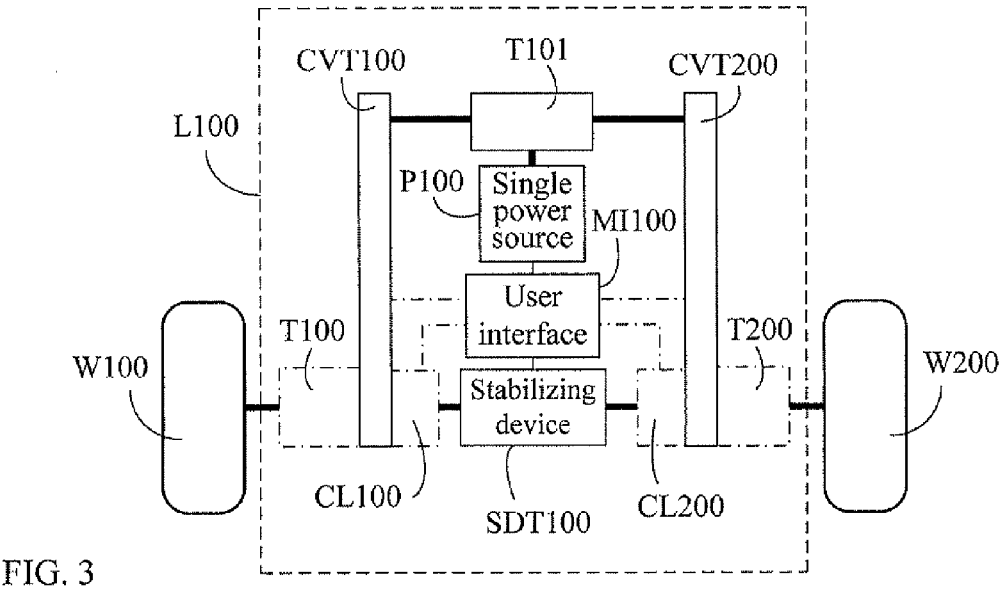
FIG. 3 is a schematic view showing a variation of the speed differential operation drive system shown in FIG. 2.

FIG. 3 is a schematic view showing an embodiment of the system, in which the transmission with multi-shaft output (T101) is additionally installed between the rotary output side of the single power source (P100) and the individual CVT, as shown in FIG. 2.

As shown in FIG. 3, the transmission with multi-shaft output (T101) is additionally installed between the rotary output side of the single power source (P100) and the individual CVT, as shown in FIG. 2, for being driven by the single power source (P100), in which the multi-shaft output side respectively drives the input sides of the continuous variable transmissions (CVT100) and (CVT200).

Figure 4:
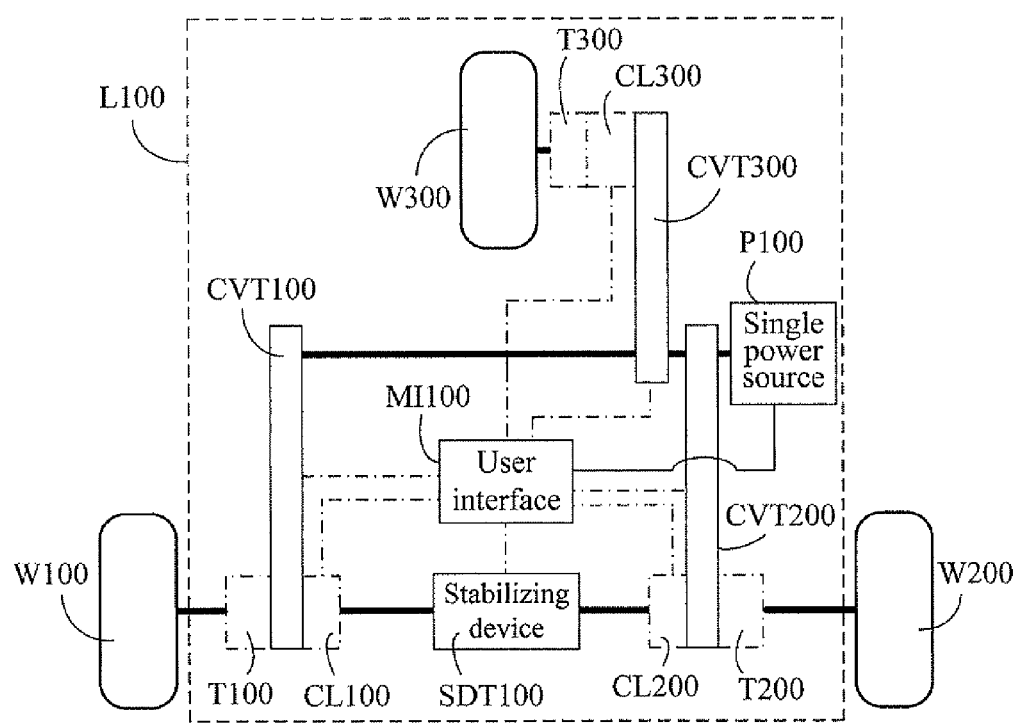
FIG. 4 is a schematic view showing the third embodiment of the speed differential operation drive system of the present invention.

FIG. 4 is a schematic view showing the third embodiment of the speed differential operation drive system of the present invention, in which between the rotary output side of the single power source (P100) and the wheel group (W300) at the load installed at the intermediate portion of the front end (or the rear end) of the common load body (L100), and the wheel group (W100) and the wheel group (W200) respectively installed at the loads at two sides of the rear end (or the front end) of the common load body (L100) are individually installed with a continuous variable transmission and installed with a stabilizing device, and through the operation of the stabilizing device (SDT100) to constitute the speed differential operation drive system.

As shown in FIG. 4, the speed differential operation drive system of the present invention is constituted by the continuous variable transmission individually installed between the rotary output side of the single power source (P100) and the wheel group (W300) installed at the load at the intermediate portion of the front end (or the rear end) of the common load body (L100), and the wheel group (W100) and the wheel group (W200) respectively installed at the loads at two sides of the rear end (or the front end) of the common load body (L100), and through the operation of the stabilizing device (SDT100), in which:

single power source (P100): constituted by the power source with rotary output kinetic energy, such as internal combustion engine, external combustion engine, spring force source, hydraulic power source, pneumatic power source, flywheel power source, or human power, or animal power, wind power source, and/or constituted by the electricity driven rotary motor, which are AC or DC, brushless or brush, synchronous or non-synchronous, internal or external rotation type; and equipped with the related control unit and the energy supply and/or storage unit;

continuous variable transmissions (CVT100), (CVT200), (CVT300): related to continuous variable transmissions, which can automatically change the speed ratio according to the load state, or change the speed ratio in receiving external manipulation, including a variety of types, such as rubber belt type, metal belt type, and chain type CVT, or the electronic continuous variable transmission (ECVT), or the friction disk type, or the conventional non-coaxial continuous variable transmission;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT100) and (CVT200), if unstable operation is caused by the varied load at individual load side during driving operation, the stabilizing device (SDT100) installed between the loads operates to stabilize the system;

transmissions (T100), (T200), (T300): related to fixed speed ratio, variable speed ratio, or stepless speed variable transmission, which is constituted by mechanical gear unit, sprocket unit, pulley unit, or linkage group; and the transmission is selectable as needed; and user interface (MI100): related to linear analog or digital, or both mixed control device, constituted by the operating mechanism, and/or the electric machine, and/or the solid state circuit, for controlling the operation of the single power source (P100), and/or controlling the operations of the continuous variable transmission (CVT100) and/or the continuous variable transmission (CVT200), and the continuous variable transmission (CVT300).

Through the operation of the above device, if the common load body (L100) is driven for operation by the single power source (P100), and the wheel groups (W100), (W200), and (W300) installed at the load perform speed differential operation, the continuous variable transmissions (CVT100), (CVT200), and (CVT300) individually regulate speed ratio according to the load variation of the wheel groups (W100), (W200), and (W300) installed at the load, so as to facilitate the speed differential operation drive between the wheel groups (W100), (W200), and (W300) at the load.

In addition, for the embodiment shown in FIG. 4, except for directly driving the load through the continuous variable transmission, or through the continuous variable transmission and the transmission, a clutch unit is further installed at the output side of the continuous variable transmission individually arranged between the individual wheel group and the single power source (P100), including: the clutch unit (CL100) is additionally installed at the output side of the continuous variable transmission (CVT100), and/or the clutch unit (CL200) is additionally installed at the output side of the continuous variable transmission (CVT200), and/or the clutch unit (CL300) is additionally installed at the output side of the continuous variable transmission (CVT300), in which:

clutch units (CL100), (CL200), (CL300): related to the clutch device or structure, controlled by manpower or centrifugal force, or through the control of user interface (MI100), with the function of linking transmission or cutting separation, which is driven by electricity, and/or magnetic power, and/or machine power, and/or gas pressure, and/or liquid pressure, and which has the rotary input side and the rotary output side;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL100) and (CL200) individually driven by the continuous variable transmissions (CVT100) and (CVT200), during driving operation, if the load at individual load side varies, or if the response time of the clutch units (CL100) and (CL200) at the loads individually driven by the continuous variable transmissions (CVT100) and (CVT200) is slower, or if the clutch units (CL100) and (CL200) operate unstably because of the synchronous response time difference thereof, the stabilizing device (SDT100) installed between the loads of the clutch units (CL100) and (CL200) operates to stabilize the system.

Figure 5:
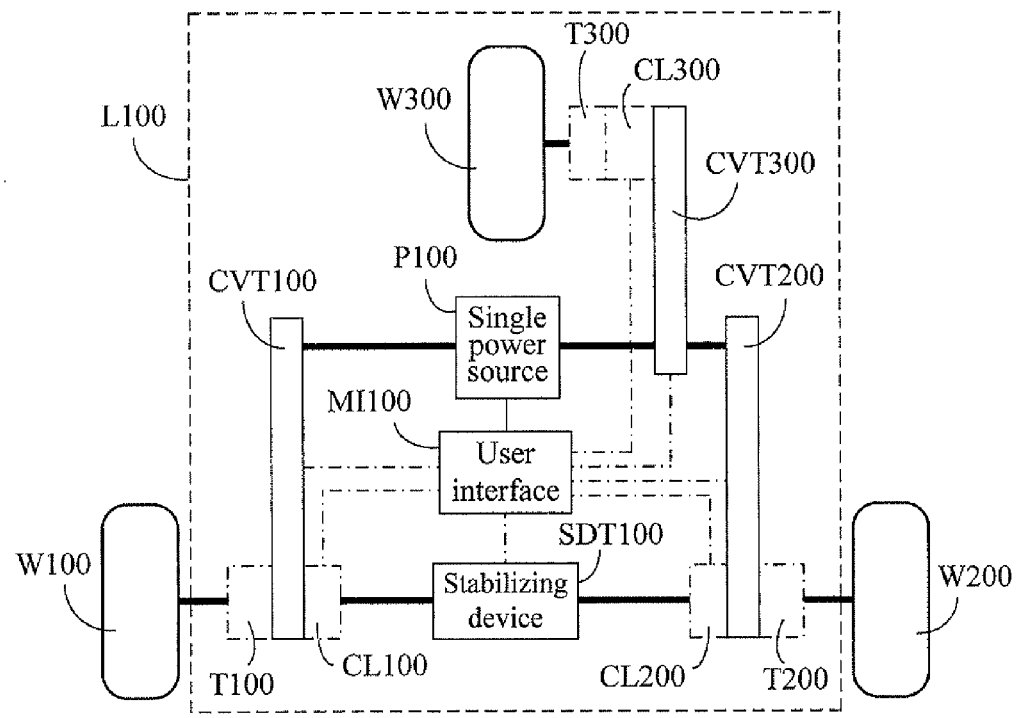
FIG. 5 is a schematic view showing the fourth embodiment of the speed differential operation drive system of the present invention.

FIG. 5 is a schematic view showing the fourth embodiment of the speed differential operation drive system of the present invention, in which between the rotary output sides at two sides of the single power source (P100) and the wheel group (W300) at the load installed at the intermediate portion of the front end (or the rear end) of the common load body (L100), and the wheel group (W100) and the wheel group (W200) respectively installed at the loads at two sides of the rear end (or the frontend) of the common load body (L100) are individually installed with a continuous variable transmission and installed with a stabilizing device to constitute the speed differential operation drive system.

As shown in FIG. 5, the speed differential operation drive system of the present invention is constituted by the continuous variable transmission individually installed between the rotary output sides at two sides of the single power source (P100) and the wheel group (W300) installed at the load at the intermediate portion of the front end (or the rear end) of the common load body (L100), and the wheel group (W100) and the wheel group (W200) respectively installed at the loads at two sides of the rear end (or the front end) of the common load body (L100), and through the operation of the stabilizing device (SDT100), in which:

single power source (P100): constituted by the power source with rotary output kinetic energy, such as internal combustion engine, external combustion engine, spring force source, hydraulic power source, pneumatic power source, flywheel power source, or human power, or animal power, wind power source, and/or constituted by the electricity driven rotary motor, which are AC or DC, brushless or brush, synchronous or non-synchronous, internal or external rotation type; and equipped with the related control unit and the energy supply and/or storage unit;

continuous variable transmissions (CVT100), (CVT200), (CVT300): related to continuous variable transmissions, which can automatically change the speed ratio according to the load state, or change the speed ratio in receiving external manipulation, including a variety of types, such as rubber belt type, metal belt type, and chain type CVT, or the electronic continuous variable transmission (ECVT), or the friction disk type, or the conventional non-coaxial continuous variable transmission;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT100) and (CVT200), if unstable operation is caused by the varied load at individual load side during driving operation, the stabilizing device (SDT100) installed between the loads operates to stabilize the system;

transmissions (T100), (T200), (T300): related to fixed speed ratio, variable speed ratio, or stepless speed variable transmission, which is constituted by mechanical gear unit, sprocket unit, pulley unit, or linkage group; and the transmission is selectable as needed; and user interface (MI100): related to linear analog or digital, or both mixed control device, constituted by the operating mechanism, and/or the electric machine, and/or the solid state circuit, for controlling the operation of the single power source (P100), and/or controlling the operations of the continuous variable transmission (CVT100), (CVT200), and (CVT300).

Through the operation of the above device, if the common load body (L100) is driven for operation by the single power source (P100), and the wheel groups (W100), (W200), and (W300) installed at the load perform speed differential operation, the continuous variable transmissions (CVT100), (CVT200), and (CVT300) individually regulate speed ratio according to the load variation of the wheel groups (W100), (W200), and (W300) installed at the load, so as to facilitate the speed differential operation drive between the wheel groups (W100), (W200), and (W300) at the load.

In addition, for the embodiment shown in FIG. 5, except for directly driving the load through the continuous variable transmission, or through the continuous variable transmission and the transmission, a clutch unit is further installed at the output side of the continuous variable transmission individually arranged between the individual wheel group and the single power source (P100), including: the clutch unit (CL100) is additionally installed at the output side of the continuous variable transmission (CVT100), and/or the clutch unit (CL200) is additionally installed at the output side of the continuous variable transmission (CVT200), and/or the clutch unit (CL300) is additionally installed at the output side of the continuous variable transmission (CVT300), in which:

clutch units (CL100), (CL200), (CL300): related to the clutch device or structure, controlled by manpower or centrifugal force, or through the control of user interface (MI100), with the function of linking transmission or cutting separation, which is driven by electricity, and/or magnetic power, and/or machine power, and/or gas pressure, and/or liquid pressure, and which has the rotary input side and the rotary output side;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL100) and (CL200) individually driven by the continuous variable transmissions (CVT100) and (CVT200), during driving operation, if the load at individual load side varies, or if the response time of the clutch units (CL100) and (CL200) at the loads individually driven by the continuous variable transmissions (CVT100) and (CVT200) is slower, or if the clutch units (CL100) and (CL200) operate unstably because of the synchronous response time difference thereof, the stabilizing device (SDT100) installed between the loads of the clutch units (CL100) and (CL200) operates to stabilize the system.

Figure 6:
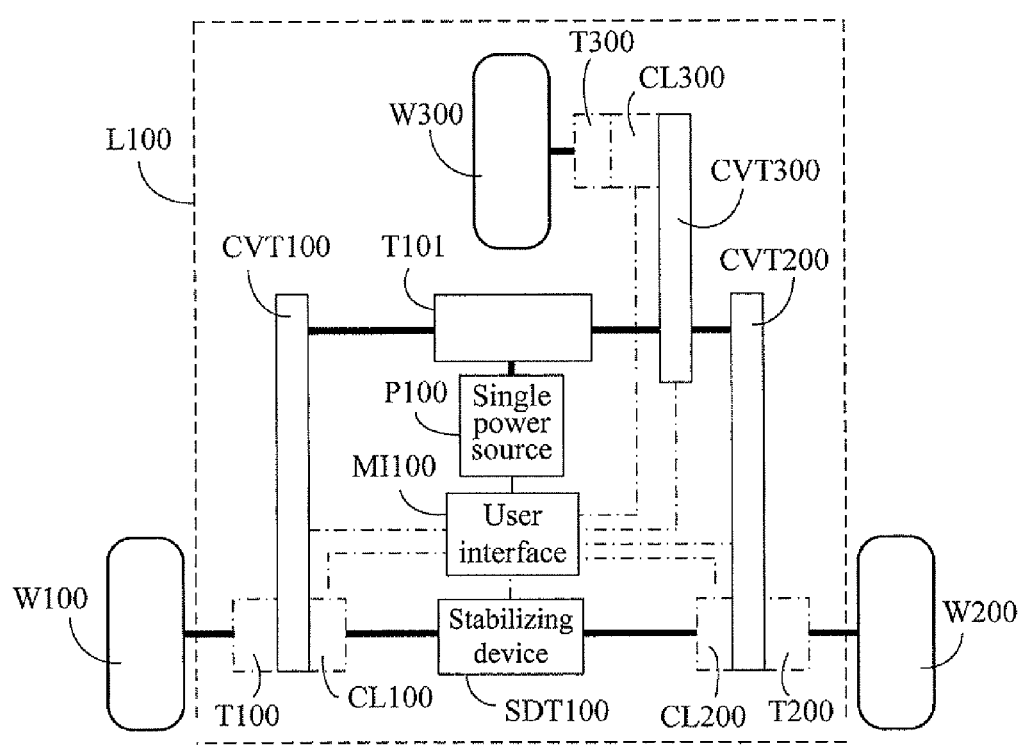
FIG. 6 is a schematic view showing a variation of the speed differential operation drive system shown in FIG. 5.

FIG. 6 is a schematic view showing an embodiment of the system, in which the transmission with multi-shaft output (T101) is additionally installed between the rotary output side of the single power source (P100) and the individual CVT, as shown in FIG. 5.

As shown in FIG. 6, the transmission with multi-shaft output (T101) is additionally installed between the rotary output side at single side of the single power source (P100) and the individual CVT, as shown in FIG. 5, for being driven by the single power source (P100), in which the multi-shaft output side respectively drives the input sides of the continuous variable transmissions (CVT100), (CVT200), and (CVT300).

Figure 7:
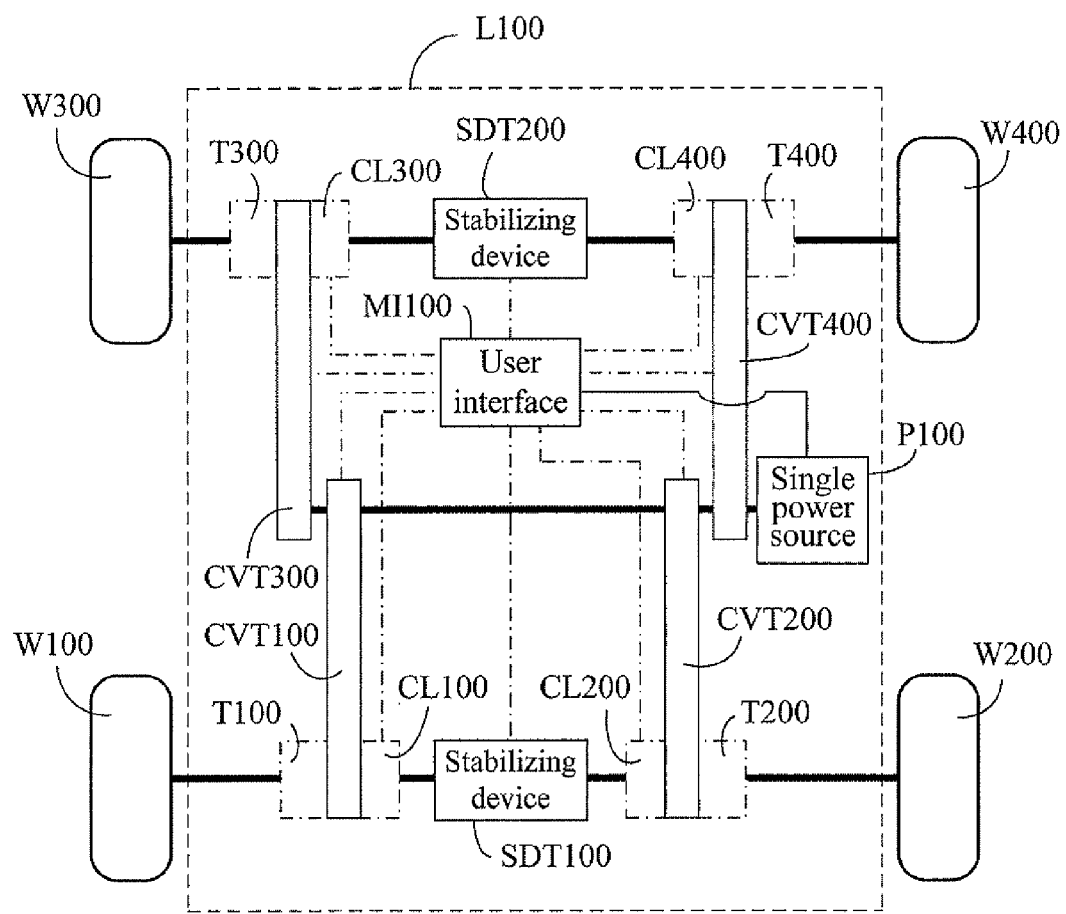
FIG. 7 is a schematic view showing the 5th embodiment of the speed differential operation drive system of the present invention.

FIG. 7 is a schematic view showing the 5th embodiment of the speed differential operation drive system of the present invention, in which between the rotary output side of the single power source (P100) and the wheel group (W300) and the wheel group (W400) at the loads installed at two sides of the front end of the common load body (L100), and the wheel group (W100) and the wheel group (W200) at the loads installed at two sides of the rear end of the common load body (L100) are individually installed with a continuous variable transmission and installed with the stabilizing devices (SDT100), (SDT200) to constitute the speed differential operation drive system.

As shown in FIG. 7, the speed differential operation drive system of the present invention is constituted by the continuous variable transmission individually installed between the rotary output side at single side of the single power source (P100) and the wheel group (W300) and the wheel group (W400) installed at the loads at two sides of the front end of the common load body (L100), and the wheel group (W100) and the wheel group (W200) installed at the loads at two sides of the rear end of the common load body (L100), and through the operation of the stabilizing devices (SDT100) and (SDT200), in which:

single power source (P100): constituted by the power source with rotary output kinetic energy, such as internal combustion engine, external combustion engine, spring force source, hydraulic power source, pneumatic power source, flywheel power source, or human power, or animal power, wind power source, and/or constituted by the electricity driven rotary motor, which are AC or DC, brushless or brush, synchronous or non-synchronous, internal or external rotation type; and equipped with the related control unit and the energy supply and/or storage unit;

continuous variable transmissions (CVT100), (CVT200), (CVT300), (CVT400): related to continuous variable transmissions, which can automatically change the speed ratio according to the load state, or change the speed ratio in receiving external manipulation, including a variety of types, such as rubber belt type, metal belt type, and chain type CVT, or the electronic continuous variable transmission (ECVT), or the friction disk type, or the conventional non-coaxial continuous variable transmission;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT100) and (CVT200), if unstable operation is caused by the varied load at individual load side during driving operation, the stabilizing device (SDT100) installed between the loads operates to stabilize the system;

stabilizing device (SDT200): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT300) and (CVT400), if unstable operation is caused by the varied load at individual load side during driving operation, the stabilizing device (SDT200) installed between the loads operates to stabilize the system;

transmissions (T100), (T200), (T300), (T400): related to fixed speed ratio, variable speed ratio, or stepless speed variable transmission, which is constituted by mechanical gear unit, sprocket unit, pulley unit, or linkage group; and the transmission is selectable as needed; and user interface (MI100): related to linear analog or digital, or both mixed control device, constituted by the operating mechanism, and/or the electric machine, and/or the solid state circuit, for controlling the operation of the single power source (P100), and/or controlling the operations of the continuous variable transmission (CVT100), (CVT200), (CVT300), and (CVT400).

Through the operation of the above device, if the common load body (L100) is driven for operation by the single power source (P100), and wheel groups (W100), (W200), (W300), and (W400) installed at the load perform speed differential operation, the continuous variable transmissions (CVT100), (CVT200), (CVT300), and (CVT400) individually regulate speed ratio according to the load variation of the wheel groups (W100), (W200), (W300), and (W400) installed at the load, so as to facilitate the speed differential operation drive between the wheel groups (W100), (W200), (W300), and (W400) at the load.

In addition, for the embodiment shown in FIG. 7, except for directly driving the load through the continuous variable transmission, or through the continuous variable transmission and the transmission, a clutch unit is further installed at the output side of the continuous variable transmission individually arranged between the individual wheel group and the single power source (P100), including: the clutch unit (CL100) is additionally installed at the output side of the continuous variable transmission (CVT100), and/or the clutch unit (CL200) is additionally installed at the output side of the continuous variable transmission (CVT200), and/or the clutch unit (CL300) is additionally installed at the output side of the continuous variable transmission (CVT300), and/or the clutch unit (CL400) is additionally installed at the output side of the continuous variable transmission (CVT400), in which:

clutch units (CL100), (CL200), (CL300), (CL400): related to the clutch device or structure, controlled by manpower or centrifugal force, or through the control of user interface (MI100), with the function of linking transmission or cutting separation, which is driven by electricity, and/or magnetic power, and/or machine power, and/or gas pressure, and/or liquid pressure, and which has the rotary input side and the rotary output side;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL100) and (CL200) individually driven by the continuous variable transmissions (CVT100) and (CVT200), during driving operation, if the load at individual load side varies, or if the response time of the clutch units (CL100) and (CL200) at the loads individually driven by the continuous variable transmissions (CVT100) and (CVT200) is slower, or if the clutch units (CL100) and (CL200) operate unstably because of the synchronous response time difference thereof, the stabilizing device (SDT100) installed between the loads of the clutch units (CL100) and (CL200) operates to stabilize the system;

stabilizing device (SDT200): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation antitorque effect, in which the two revolution ends individually link between two loads of the clutch units (CL300) and (CL400) individually driven by the continuous variable transmissions (CVT300) and (CVT400), during driving operation, if the load at individual load side varies, or if the response time of the clutch units (CL300) and (CL400) at the loads individually driven by the continuous variable transmissions (CVT300) and (CVT400) is slower, or if the clutch units (CL300) and (CL400) operate unstably because of the synchronous response time difference thereof, the stabilizing device (SDT200) installed between the loads of the clutch units (CL300) and (CL400) operates to stabilize the system.

Figure 8:
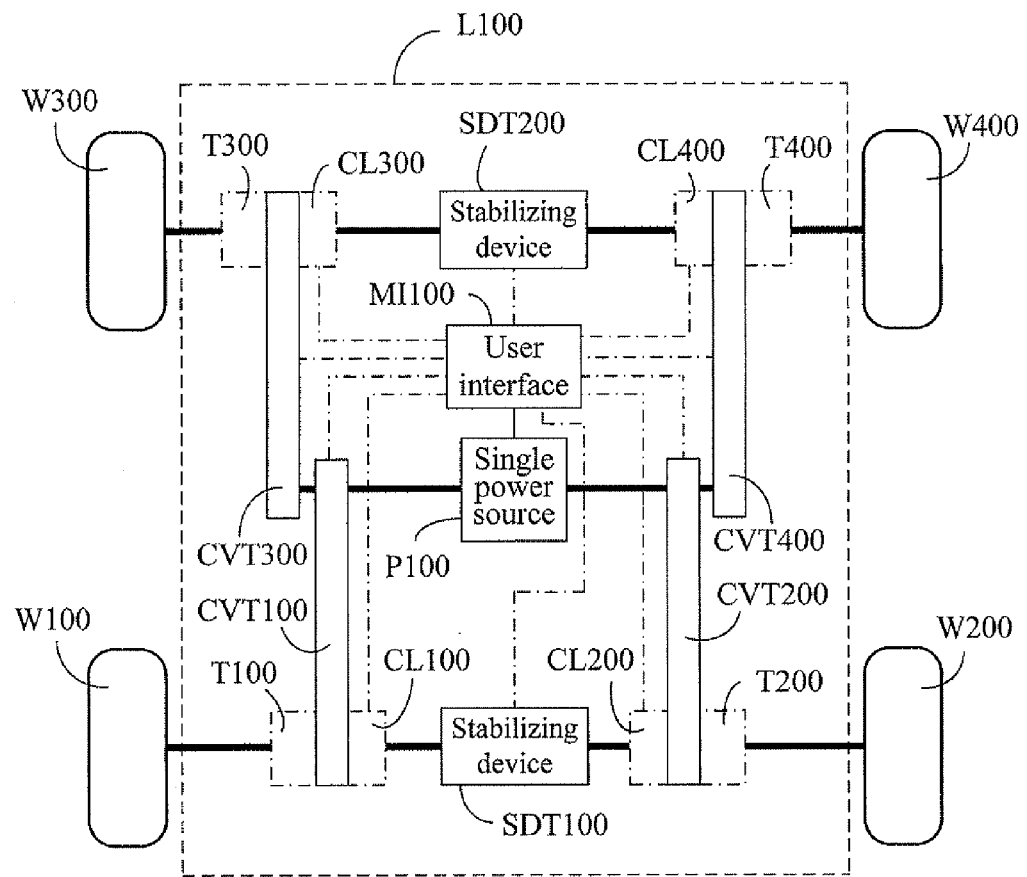
FIG. 8 is a schematic view showing the 6th embodiment of the speed differential operation drive system of the present invention.

FIG. 8 is a schematic view showing the 6th embodiment of the speed differential operation drive system of the present invention, in which between the rotary output sides at two sides of the single power source (P100) and the wheel group (W300) and the wheel group (W400) at the loads installed at two sides of the front end of the common load body (L100), and the wheel group (W100) and the wheel group (W200) at the loads installed at two sides of the rear end of the common load body (L100) are individually installed with a continuous variable transmission and installed with stabilizing devices (SDT100), (SDT200) to constitute the speed differential operation drive system.

As shown in FIG. 8, the speed differential operation drive system of the present invention is constituted by the continuous variable transmission individually installed between the rotary output sides at two sides of the single power source (P100) and the wheel group (W300) and the wheel group (W400) installed at the loads at two sides of the front end of the common load body (L100), and the wheel group (W100) and the wheel group (W200) installed at the loads at two sides of the rear end of the common load body (L100), and through the operation of the stabilizing devices (SDT100) and (SDT200), in which:

single power source (P100): constituted by the power source with rotary output kinetic energy, such as internal combustion engine, external combustion engine, spring force source, hydraulic power source, pneumatic power source, flywheel power source, or human power, or animal power, wind power source, and/or constituted by the electricity driven rotary motor, which are AC or DC, brushless or brush, synchronous or non-synchronous, internal or external rotation type; and equipped with the related control unit and the energy supply and/or storage unit;

continuous variable transmissions (CVT100), (CVT200), (CVT300), (CVT400): related to continuous variable transmissions, which can automatically change the speed ratio according to the load state, or change the speed ratio in receiving external manipulation, including a variety of types, such as rubber belt type, metal belt type, and chain type CVT, or the electronic continuous variable transmission (ECVT), or the friction disk type, or the conventional non-coaxial continuous variable transmission;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation antitorque effect, in which the two revolution ends individually link between the loads of the continuous variable transmissions (CVT100) and (CVT200), if unstable operation is caused by the varied load at individual load side during driving operation, the stabilizing device (SDT100) installed between the loads operates to stabilize the system;

stabilizing device (SDT200): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation antitorque effect, in which the two revolution ends individually link between the loads of the continuous variable transmissions (CVT300) and (CVT400), if unstable operation is caused by the varied load at individual load side during driving operation, the stabilizing device (SDT200) installed between the loads operates to stabilize the system;

transmissions (T100), (T200), (T300), (T400): related to fixed speed ratio, variable speed ratio, or stepless speed variable transmission, which is constituted by mechanical gear unit, sprocket unit, pulley unit, or linkage group; and the transmission is selectable as needed; and user interface (MI100): related to linear analog or digital, or both mixed control device, constituted by the operating mechanism, and/or the electric machine, and/or the solid state circuit, for controlling the operation of the single power source (P100), and/or controlling the operations of the continuous variable transmission (CVT100), (CVT200), (CVT300), and (CVT400).

Through the operation of the above device, if the common load body (L100) is driven for operation by the single power source (P100), and the wheel groups (W100), (W200), (W300), and (W400) installed at the load perform speed differential operation, the continuous variable transmissions (CVT100), (CVT200), (CVT300), and (CVT400) individually regulate speed ratio according to the load variation of the wheel groups (W100), (W200), (W300), and (W400) installed at the load, so as to facilitate the speed differential operation drive between the wheel groups (W100), (W200), (W300), and (W400) at the load.

In addition, for the embodiment shown in FIG. 8, except for directly driving the load through the continuous variable transmission, or through the continuous variable transmission and the transmission, a clutch unit is further installed at the output side of the continuous variable transmission individually arranged between the individual wheel group and the single power source (P100), including: the clutch unit (CL100) is additionally installed at the output side of the continuous variable transmission (CVT100), and/or the clutch unit (CL200) is additionally installed at the output side of the continuous variable transmission (CVT200), and/or the clutch unit (CL300) is additionally installed at the output side of the continuous variable transmission (CVT300), and/or the clutch unit (CL400) is additionally installed at the output side of the continuous variable transmission (CVT400), in which:

clutch units (CL100), (CL200), (CL300), (CL400): related to the clutch device or structure, controlled by manpower or centrifugal force, or through the control of user interface (MI100), with the function of linking transmission or cutting separation, which is driven by electricity, and/or magnetic power, and/or machine power, and/or gas pressure, and/or liquid pressure, and which has the rotary input side and the rotary output side;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL100) and (CL200) individually driven by the continuous variable transmissions (CVT100) and (CVT200), during driving operation, if the load at individual load side varies, or if the response time of the clutch units (CL100) and (CL200) at the loads individually driven by the continuous variable transmissions (CVT100) and (CVT200) is slower, or if the clutch units (CL100) and (CL200) operate unstably because of the synchronous response time difference thereof, the stabilizing device (SDT100) installed between the loads of the clutch units (CL100) and (CL200) operates to stabilize the system;

stabilizing device (SDT200): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL300) and (CL400) individually driven by the continuous variable transmissions (CVT300) and (CVT400), during driving operation, if the load at individual load side varies, or if the response time of the clutch units (CL300) and (CL400) at the loads individually driven by the continuous variable transmissions (CVT300) and (CVT400) is slower, or if the clutch units (CL300) and (CL400) operate unstably because of the synchronous response time difference thereof, the stabilizing device (SDT200) installed between the loads of the clutch units (CL300) and (CL400) operates to stabilize the system.

Figure 9:
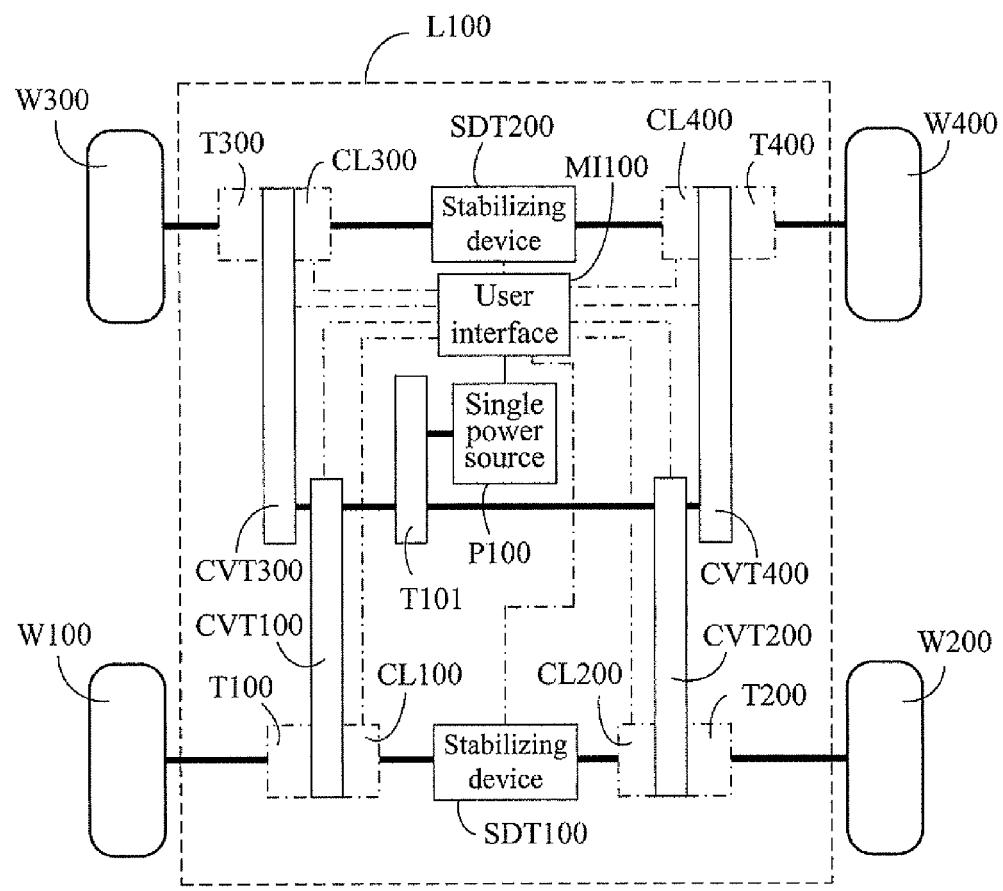
FIG. 9 is a schematic view showing a variation of the speed differential operation drive system shown in FIG. 8.

FIG. 9 is a schematic view showing an embodiment of the system, in which the transmission with multi-shaft output (T101) is additionally installed between the rotary output side of the single power source (P100) and the individual CVT, as shown in FIG. 8.

As shown in FIG. 9, the transmission with multi-shaft output (T101) is additionally installed between the rotary output side at single side of the single power source (P100) and the individual CVT, as shown in FIG. 8, for being driven by the single power source (P100), in which the multi-shaft output side drives the input sides of the continuous variable transmissions (CVT100), (CVT200), (CVT300), and (CVT400), respectively.

Figure 10:
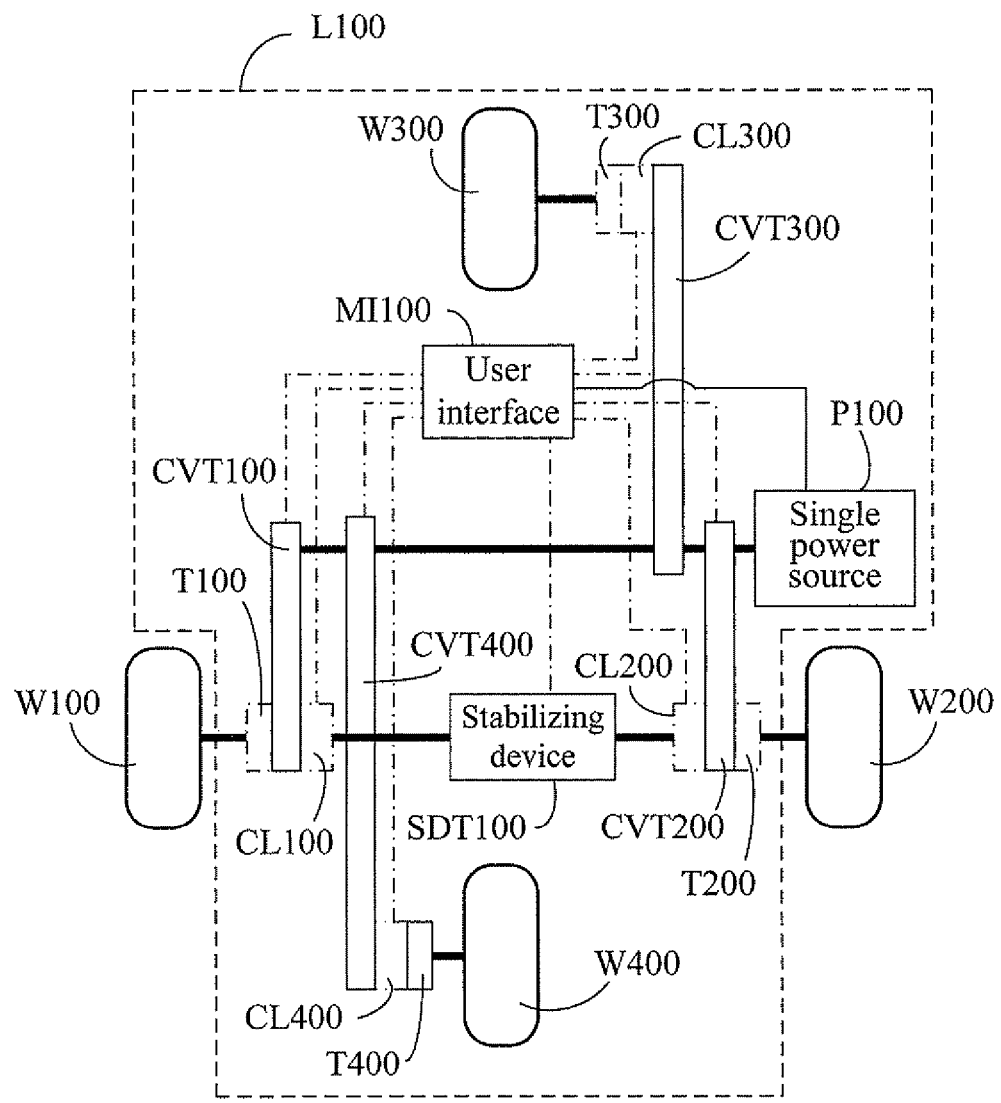
FIG. 10 is a schematic view showing the 7th embodiment of the speed differential operation drive system of the present invention.

FIG. 10 is a schematic view showing the 7th embodiment of the speed differential operation drive system of the present invention, in which between the rotary output side of the single power source (P100) and the wheel group (W300) at the load installed at the intermediate portion of the front end of the common load body (L100), the wheel group (W400) at the load installed at the intermediate portion of the rear end of the common load body (L100), and the wheel group (W100) and the wheel group (W200) respectively installed at the loads at two sides of the intermediate portion of the common load body (L100) are individually installed with a continuous variable transmission and installed with a stabilizing device (SDT100) to constitute the speed differential operation drive system.

As shown in FIG. 10, the speed differential operation drive system of the present invention is constituted by the continuous variable transmission individually installed between the rotary output side at single side of the single power source (P100) and the wheel group (W300) installed at the load at the intermediate portion of the front end of the common load body (L100), the wheel group (W400) installed at the load at the intermediate portion of the rear end of the common load body (L100), and the wheel group (W100) and the wheel group (W200) respectively installed at the loads at two sides of the intermediate portion of the common load body (L100), and through the operation of the stabilizing device (SDT100), in which:

single power source (P100): constituted by the power source with rotary output kinetic energy, such as internal combustion engine, external combustion engine, spring force source, hydraulic power source, pneumatic power source, flywheel power source, or human power, or animal power, wind power source, and/or constituted by the electricity driven rotary motor, which are AC or DC, brushless or brush, synchronous or non-synchronous, internal or external rotation type; and equipped with the related control unit and the energy supply and/or storage unit;

continuous variable transmissions (CVT100), (CVT200), (CVT300), (CVT400): related to continuous variable transmissions, which can automatically change the speed ratio according to the load state, or change the speed ratio in receiving external manipulation, including a variety of types, such as rubber belt type, metal belt type, and chain type CVT, or the electronic continuous variable transmission (ECVT), or the friction disk type, or the conventional non-coaxial continuous variable transmission;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT100) and (CVT200), if unstable operation is caused by the varied load at individual load side during driving operation, the stabilizing device (SDT100) installed between the loads operates to stabilize the system;

transmissions (T100), (T200), (T300), (T400): related to fixed speed ratio, variable speed ratio, or stepless speed variable transmission, which is constituted by mechanical gear unit, sprocket unit, pulley unit, or linkage group; and the transmission is selectable as needed; and user interface (MI100): related to linear analog or digital, or both mixed control device, constituted by the operating mechanism, and/or the electric machine, and/or the solid state circuit, for controlling the operation of the single power source (P100), and/or controlling the operations of the continuous variable transmission (CVT100), (CVT200), (CVT300), and (CVT400).

Through the operation of the above device, if the common load body (L100) is driven for operation by the single power source (P100), and the wheel groups (W100), (W200), (W300), and (W400) installed at the load perform speed differential operation, the continuous variable transmissions (CVT100), (CVT200), (CVT300), and (CVT400) individually regulate speed ratio according to the load variation of the wheel groups (W100), (W200), (W300), and (W400) installed at the load, so as to facilitate the speed differential operation drive between the wheel groups (W100), (W200), (W300), and (W400) at the load.

In addition, for the embodiment shown in FIG. 10, except for directly driving the load through the continuous variable transmission, or through the continuous variable transmission and the transmission, a clutch unit is further installed at the output side of the continuous variable transmission individually arranged between the individual wheel group and the single power source (P100), including: the clutch unit (CL100) is additionally installed at the output side of the continuous variable transmission (CVT100), and/or the clutch unit (CL200) is additionally installed at the output side of the continuous variable transmission (CVT200), and/or the clutch unit (CL300) is additionally installed at the output side of the continuous variable transmission (CVT300), and/or the clutch unit (CL400) is additionally installed at the output side of the continuous variable transmission (CVT400), in which:

clutch units (CL100), (CL200), (CL300), (CL400): related to the clutch device or structure, controlled by manpower or centrifugal force, or through the control of user interface (MI100), with the function of linking transmission or cutting separation, which is driven by electricity, and/or magnetic power, and/or machine power, and/or gas pressure, and/or liquid pressure, and which has the rotary input side and the rotary output side;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL100) and (CL200) individually driven by the continuous variable transmissions (CVT100) and (CVT200), during driving operation, if the load at individual load side varies, or if the response time of the clutch units (CL100) and (CL200) at the loads individually driven by the continuous variable transmissions (CVT100) and (CVT200) is slower, or if the clutch units (CL100) and (CL200) operate unstably because of the synchronous response time difference thereof, the stabilizing device (SDT100) installed between the loads of the clutch units (CL100) and (CL200) operates to stabilize the system.

Figure 11:
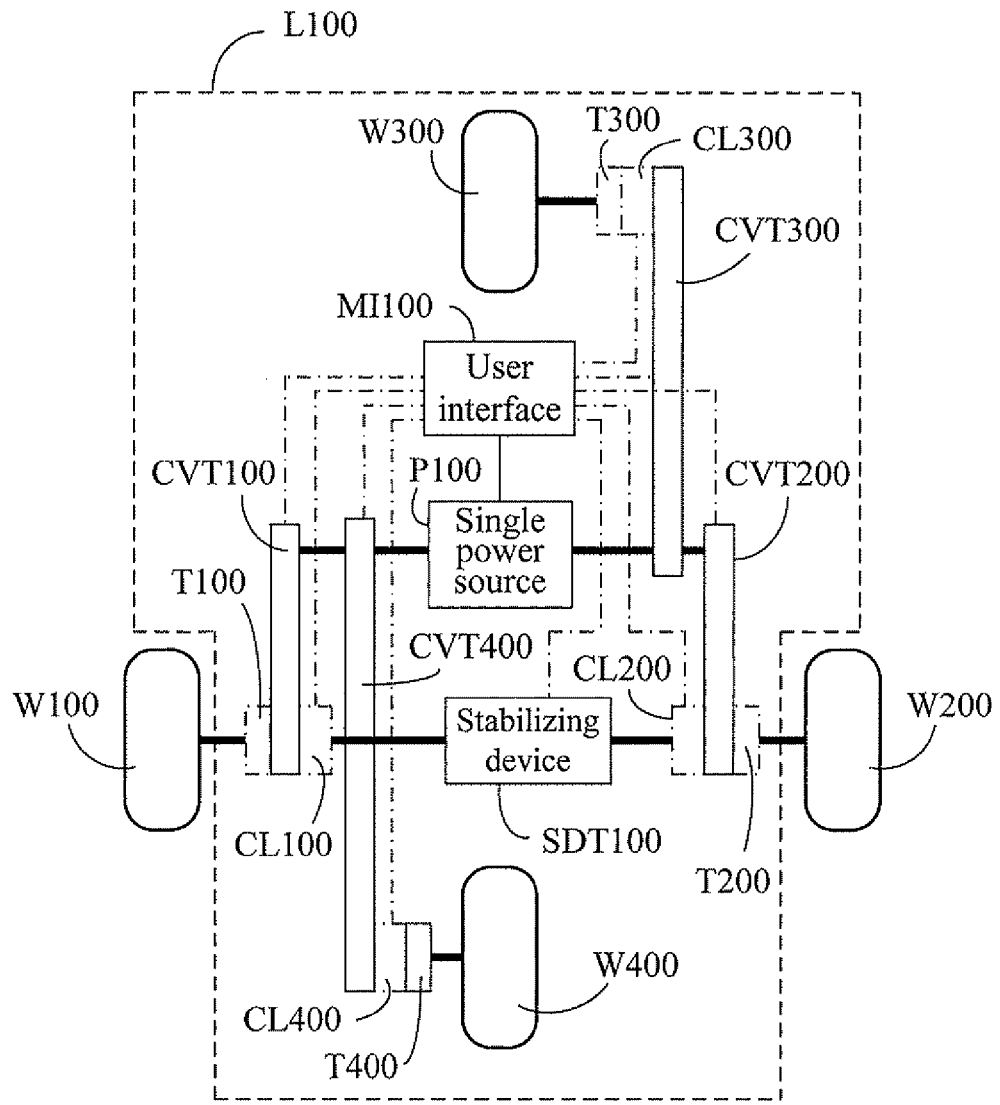
FIG. 11 is a schematic view showing the 8th embodiment of the speed differential operation drive system of the present invention.

FIG. 11 is a schematic view showing the 8th embodiment of the speed differential operation drive system of the present invention, in which between the rotary output sides at two sides of the single power source (P100) and the wheel group (W300) at the load installed at the intermediate portion of the front end of the common load body (L100), the wheel group (W400) at the load installed at the intermediate portion of the rear end of the common load body (L100), and the wheel group (W100) and the wheel group (W200) respectively installed at the loads at two sides of the intermediate portion of the common load body (L100) are individually installed with a continuous variable transmission and installed with a stabilizing device (SDT100) to constitute the speed differential operation drive system.

As shown in FIG. 11, the speed differential operation drive system of the present invention is constituted by the continuous variable transmission individually installed between the rotary output sides at two sides of the single power source (P100) and the wheel group (W300) installed at the load at the intermediate portion of the front end of the common load body (L100), the wheel group (W400) installed at the load at the intermediate portion of the rear end of the common load body (L100), and the wheel group (W100) and the wheel group (W200) respectively installed at the loads at two sides of the intermediate portion of the common load body (L100), and through the operation of the stabilizing device (SDT100), in which:

single power source (P100): constituted by the power source with rotary output kinetic energy, such as internal combustion engine, external combustion engine, spring force source, hydraulic power source, pneumatic power source, flywheel power source, or human power, or animal power, wind power source, and/or constituted by the electricity driven rotary motor, which are AC or DC, brushless or brush, synchronous or non-synchronous, internal or external rotation type; and equipped with the related control unit and the energy supply and/or storage unit;

continuous variable transmissions (CVT100), (CVT200), (CVT300), (CVT400): related to continuous variable transmissions, which can automatically change the speed ratio according to the load state, or change the speed ratio in receiving external manipulation, including a variety of types, such as rubber belt type, metal belt type, and chain type CVT, or the electronic continuous variable transmission (ECVT), or the friction disk type, or the conventional non-coaxial continuous variable transmission;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT100) and (CVT200), if unstable operation is caused by the varied load at individual load side during driving operation, the stabilizing device (SDT100) installed between the loads operates to stabilize the system;

transmissions (T100), (T200), (T300), (T400): related to fixed speed ratio, variable speed ratio, or stepless speed variable transmission, which is constituted by mechanical gear unit, sprocket unit, pulley unit, or linkage group; and the transmission is selectable as needed; and user interface (MI100): related to linear analog or digital, or both mixed control device, constituted by the operating mechanism, and/or the electric machine, and/or the solid state circuit, for controlling the operation of the single power source (P100), and/or controlling the operations of the continuous variable transmission (CVT100), (CVT200), (CVT300), and (CVT400).

Through the operation of the above device, if the common load body (L100) is driven for operation by the single power source (P100), and the wheel groups (W100), (W200), (W300), and (W400) installed at the load perform speed differential operation, the continuous variable transmissions (CVT100), (CVT200), (CVT300), and (CVT400) individually regulate speed ratio according to the load variation of the wheel groups (W100), (W200), (W300), and (W400) installed at the load, so as to facilitate the speed differential operation drive between the wheel groups (W100), (W200), (W300), and (W400) at the load.

In addition, for the embodiment shown in FIG. 11, except for directly driving the load through the continuous variable transmission, or through the continuous variable transmission and the transmission, a clutch unit is further installed at the output side of the continuous variable transmission individually arranged between the individual wheel group and the single power source (P100), including: the clutch unit (CL100) is additionally installed at the output side of the continuous variable transmission (CVT100), and/or the clutch unit (CL200) is additionally installed at the output side of the continuous variable transmission (CVT200), and/or the clutch unit (CL300) is additionally installed at the output side of the continuous variable transmission (CVT300), and/or the clutch unit (CL400) is additionally installed at the output side of the continuous variable transmission (CVT400), in which:

clutch units (CL100), (CL200), (CL300), (CL400): related to the clutch device or structure, controlled by manpower or centrifugal force, or through the control of user interface (MI100), with the function of linking transmission or cutting separation, which is driven by electricity, and/or magnetic power, and/or machine power, and/or gas pressure, and/or liquid pressure, and which has the rotary input side and the rotary output side;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL100) and (CL200) individually driven by the continuous variable transmissions (CVT100) and (CVT200), during driving operation, if the load at individual load side varies, or if the response time of the clutch units (CL100) and (CL200) at the loads individually driven by the continuous variable transmissions (CVT100) and (CVT200) is slower, or if the clutch units (CL100) and (CL200) operate unstably because of the synchronous response time difference thereof, the stabilizing device (SDT100) installed between the loads of the clutch units (CL100) and (CL200) operates to stabilize the system.

Figure 12:
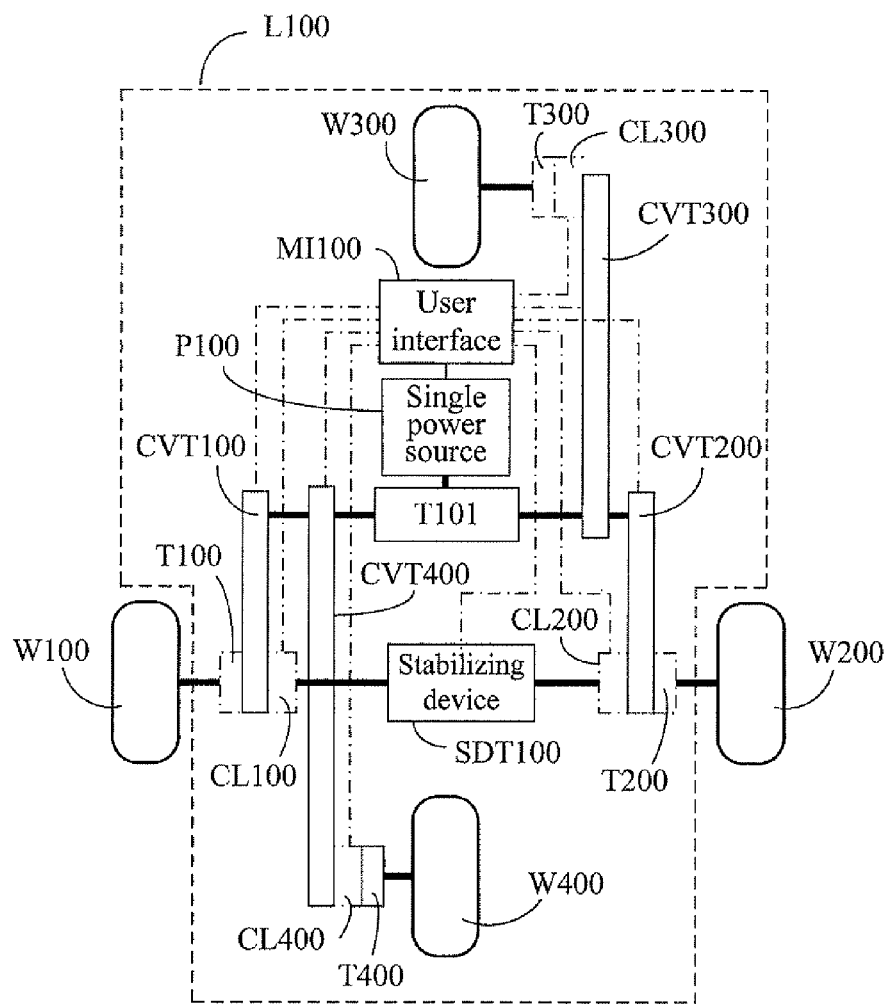
FIG. 12 is a schematic view showing a variation of the speed differential operation drive system shown in FIG. 11.

FIG. 12 is a schematic view showing an embodiment of the system, in which the transmission with multi-shaft output (T101) is additionally installed between the rotary output side of the single power source (P100) and the individual CVT, as shown in FIG. 11.

As shown in FIG. 12, the transmission with multi-shaft output (T101) is additionally installed between the rotary output side at single side of the single power source (P100) and the individual CVT, as shown in FIG. 11, for being driven by the single power source (P100), in which the multi-shaft output side drives the input sides of the continuous variable transmissions (CVT100), (CVT200), (CVT300), and (CVT400), respectively.

Figure 13:
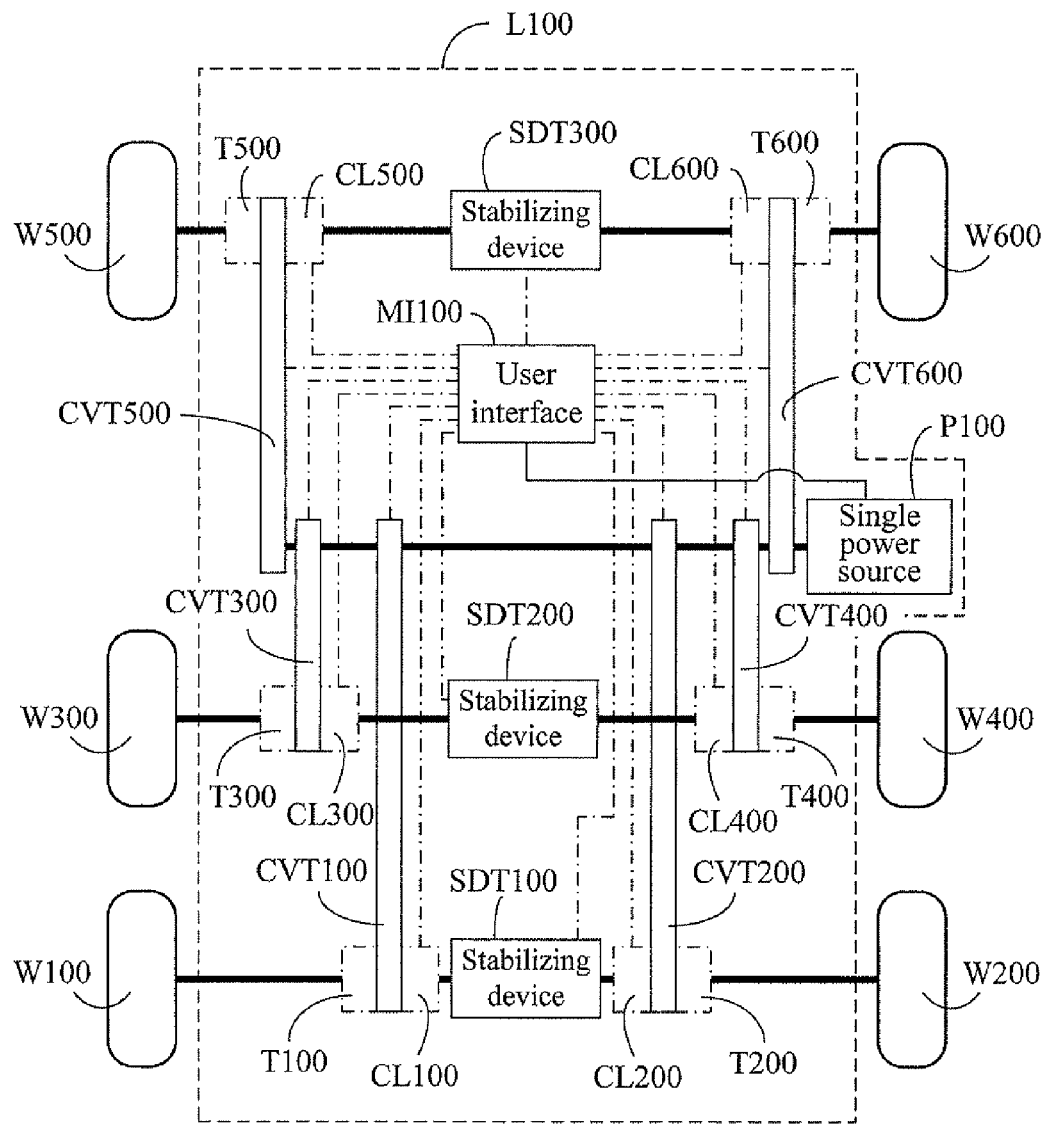
FIG. 13 is a schematic view showing the 9th embodiment of the speed differential operation drive system of the present invention.

FIG. 13 is a schematic view showing the 9th embodiment of the speed differential operation drive system of the present invention, in which between the rotary output side of the single power source (P100) and the wheel group (W500) and the wheel group (W600) at the loads installed at two sides of the front end of the common load body (L100), the wheel group (W300) and the wheel group (W400) at the loads installed at two sides of the intermediate portion of the common load body (L100), and the wheel group (W100) and the wheel group (W200) at the loads installed at two sides of the rear end of the common load body (L100) are individually installed with a continuous variable transmission and installed with stabilizing devices (SDT100), (SDT200), and (SDT300) to constitute the speed differential operation drive system.

As shown in FIG. 13, the speed differential operation drive system of the present invention is constituted by the continuous variable transmission individually installed between the rotary output side at single side of the single power source (P100) and the wheel group (W500) and the wheel group (W600) installed at the loads at two sides of the front end of the common load body (L100), the wheel group (W300) and the wheel group (W400) installed at the loads at two sides of the intermediate portion of the common load body (L100), and the wheel group (W100) and the wheel group (W200) installed at the loads at two sides of the rear end of the common load body (L100), and through the operation of the stabilizing devices (SDT100), (SDT200) and (SDT300), in which:

single power source (P100): constituted by the power source with rotary output kinetic energy, such as internal combustion engine, external combustion engine, spring force source, hydraulic power source, pneumatic power source, flywheel power source, or human power, or animal power, wind power source, and/or constituted by the electricity driven rotary motor, which are AC or DC, brushless or brush, synchronous or non-synchronous, internal or external rotation type; and equipped with the related control unit and the energy supply and/or storage unit;

continuous variable transmissions (CVT100), (CVT200), (CVT300), (CVT400), (CVT500), (CVT600): related to continuous variable transmissions, which can automatically change the speed ratio according to the load state, or change the speed ratio in receiving external manipulation, including a variety of types, such as rubber belt type, metal belt type, and chain type CVT, or the electronic continuous variable transmission (ECVT), or the friction disk type, or the conventional non-coaxial continuous variable transmission;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT100) and (CVT200), if unstable operation is caused by the varied load at individual load side during driving operation, the stabilizing device (SDT100) installed between the loads operates to stabilize the system;

stabilizing device (SDT200): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT300) and (CVT400), if unstable operation is caused by the varied load at individual load side during driving operation, the stabilizing device (SDT200) installed between the loads operates to stabilize the system;

stabilizing device (SDT300): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT500) and (CVT600), if unstable operation is caused by the varied load at individual load side during driving operation, the stabilizing device SD(T600) installed between the loads operates to stabilize the system;

transmissions (T100), (T200), (T300), (T400), (T500), (T600): related to fixed speed ratio, variable speed ratio, or stepless speed variable transmission, which is constituted by mechanical gear unit, sprocket unit, pulley unit, or linkage group; and the transmission is selectable as needed; and user interface (MI100): related to linear analog or digital, or both mixed control device, constituted by the operating mechanism, and/or the electric machine, and/or the solid state circuit, for controlling the operation of the single power source (P100), and/or controlling the operations of the continuous variable transmission (CVT100), (CVT200), (CVT300), (CVT400), (CVT500), and (CVT600).

Through the operation of the above device, if the common load body (L100) is driven for operation by the single power source (P100), and the wheel groups (W100), (W200), (W300), (W400), (W500), and (W600) installed at the load perform speed differential operation, the continuous variable transmissions (CVT100), (CVT200), (CVT300), (CVT400), (CVT500), and (CVT600) individually regulate speed ratio according to the load variation of the wheel groups (W100), (W200), (W300), (W400), (W500), and (W600) installed at the load, so as to facilitate the speed differential operation drive between the wheel groups (W100), (W200), (W300), (W400), (W500), and (W600) at the load.

In addition, for the embodiment shown in FIG. 13, except for directly driving the load through the continuous variable transmission, or through the continuous variable transmission and the transmission, a clutch unit is further installed at the output side of the continuous variable transmission CVT individually arranged, between the individual wheel group and the single power source (P100), including: the clutch unit (CL100) is additionally installed at the output side of the continuous variable transmission (CVT100), and/or the clutch unit (CL200) is additionally installed at the output side of the continuous variable transmission (CVT200), and/or the clutch unit (CL300) is additionally installed at the output side of the continuous variable transmission (CVT300), and/or the clutch unit (CL400) is additionally installed at the output side of the continuous variable transmission (CVT400), and/or the clutch unit (CL500) is additionally installed at the output side of the continuous variable transmission (CVT500), and/or the clutch unit (CL600) is additionally installed at the output side of the continuous variable transmission (CVT600), in which:

clutch units (CL100), (CL200), (CL300), (CL400), (CL500), (CL600): related to the clutch device or structure, controlled by manpower or centrifugal force, or through the control of user interface (MI100), with the function of linking transmission or cutting separation, which is driven by electricity, and/or magnetic power, and/or machine power, and/or gas pressure, and/or liquid pressure, and which has the rotary input side and the rotary output side;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL100) and (CL200) individually driven by the continuous variable transmissions (CVT100) and (CVT200), during driving operation, if the load at individual load side varies, or if the response time of the clutch units (CL100) and (CL200) at the loads individually driven by the continuous variable transmissions (CVT100) and (CVT200) is slower, or if the clutch units (CL100) and (CL200) operate unstably because of the synchronous response time difference thereof, the stabilizing device (SDT100) installed between the loads of the clutch units (CL100) and (CL200) operates to stabilize the system;

stabilizing device (SDT200): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL300) and (CL400) individually driven by the continuous variable transmissions (CVT300) and (CVT400), during driving operation, if the load at individual load side varies, or if the response time of the clutch units (CL300) and (CL400) at the loads individually driven by the continuous variable transmissions (CVT300) and (CVT400) is slower, or if the clutch units (CL300) and (CL400) operate unstably because of the synchronous response time difference thereof, the stabilizing device (SDT200) installed between the loads of the clutch units (CL300) and (CL400) operates to stabilize the system;

stabilizing device (SDT300): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the clutch units (CL500) and (CL600) individually driven by the continuous variable transmissions (CVT500) and (CVT600), during driving operation, if the load at individual load side varies, or if the response time of the clutch units (CL500) and (CL600) at the loads individually driven by the continuous variable transmissions (CVT500) and (CVT600) is slower, or if the clutch units (CL500) and (CL600) operate unstably because of the synchronous response time difference thereof, the stabilizing device (SDT300) installed between the loads of the clutch units (CL500) and (CL600) operates to stabilize the system.

Figure 14:
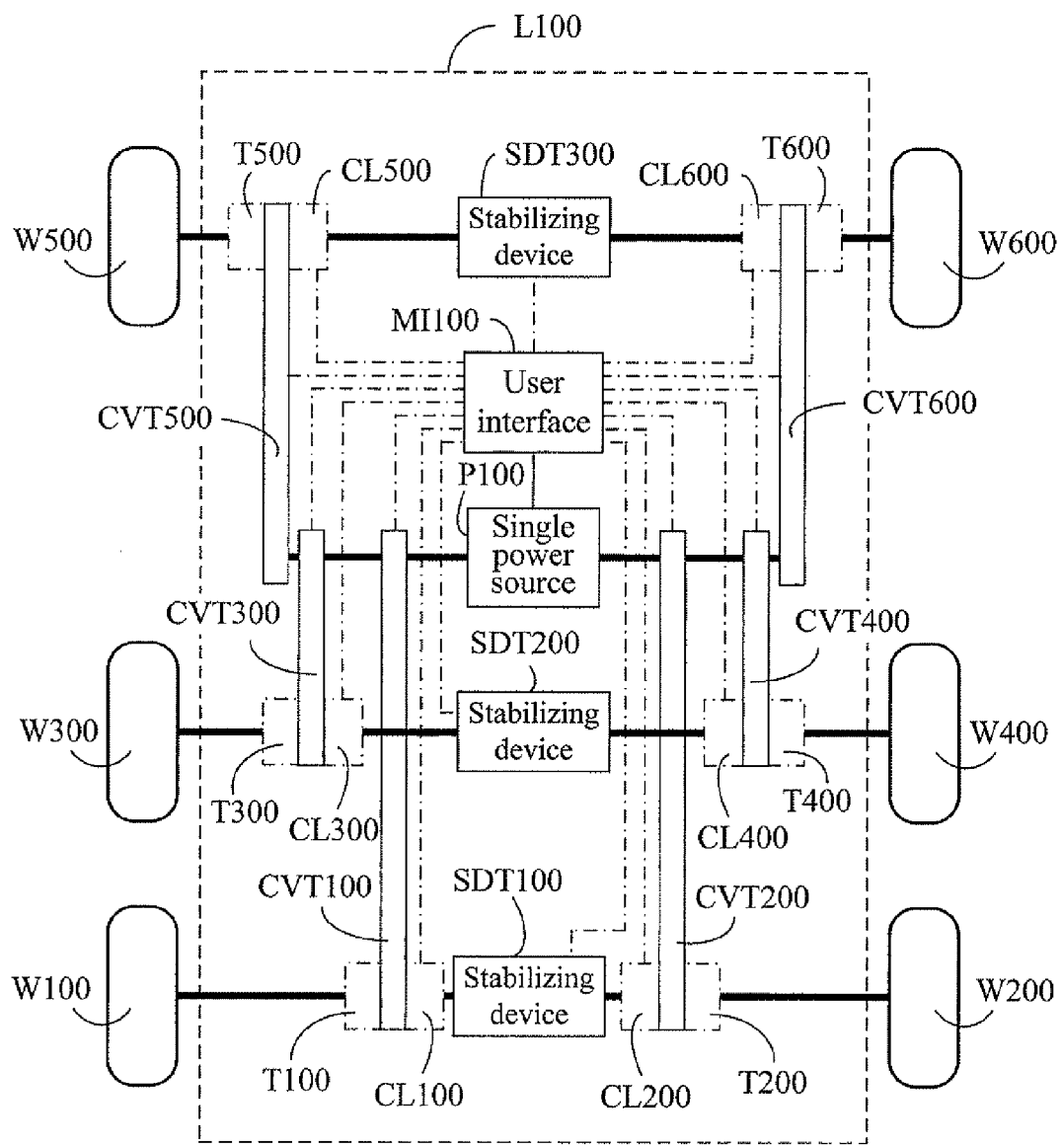
FIG. 14 is a schematic view showing the 10th embodiment of the speed differential operation drive system of the present invention.

FIG. 14 is a schematic view showing the 10th embodiment of the speed differential operation drive system of the present invention, in which between the rotary output sides at two sides of the single power source (P100) and the wheel group (W500) and the wheel group (W600) at the loads installed at two sides of the front end of the common load body (L100), the wheel group (W300) and the wheel group (W400) at the loads installed at two sides of the intermediate portion of the common load body (L100), and the wheel group (W100) and the wheel group (W200) at the loads installed at two sides of the reverse side of the common load body (L100) are individually installed with a continuous variable transmission and installed with the stabilizing devices (SDT100), (SDT200), and (SDT300) to constitute the speed differential operation drive system.

As shown in FIG. 14, the speed differential operation drive system of the present invention is constituted by the continuous variable transmission individually installed between the rotary output sides at two sides of the single power source (P100) and the wheel group (W500) and the wheel group (W600) installed at the loads at two sides of the front end of the common load body (L100), the wheel group (W300) and the wheel group (W400) installed at the loads at two sides of the intermediate portion of the common load body (L100), and the wheel group (W100) and the wheel group (W200) installed at the loads at two sides of the rear end of the common load body (L100), and through the operation of the stabilizing devices (SDT100), (SDT200) and (SDT300), in which:

single power source (P100): constituted by the power source with rotary output kinetic energy, such as internal combustion engine, external combustion engine, spring force source, hydraulic power source, pneumatic power source, flywheel power source, or human power, or animal power, wind power source, and/or constituted by the electricity driven rotary motor, which are AC or DC, brushless or brush, synchronous or non-synchronous, internal or external rotation type; and equipped with the related control unit and the energy supply and/or storage unit;

continuous variable transmissions (CVT100), (CVT200), (CVT300), (CVT400), (CVT500), (CVT600): related to continuous variable transmissions, which can automatically change the speed ratio according to the load state, or change the speed ratio in receiving external manipulation, including a variety of types, such as rubber belt type, metal belt type, and chain type CVT, or the electronic continuous variable transmission (ECVT), or the friction disk type, or the conventional non-coaxial continuous variable transmission;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT100) and (CVT200), if unstable operation is caused by the varied load at individual load side during driving operation, the stabilizing device (SDT100) installed between the loads operates to stabilize the system;

stabilizing device (SDT200): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT300) and (CVT400), if unstable operation is caused by the varied load at individual load side during driving operation, the stabilizing device (SDT200) installed between the loads operates to stabilize the system;

stabilizing device (SDT300): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between the loads of the continuous variable transmissions (CVT500) and (CVT600), if unstable operation is caused by the varied load at individual load side during driving operation, the stabilizing device (SDT300) installed between the loads operates to stabilize the system;

transmissions (T100), (T200), (T300), (T400), (T500), (T600): related to fixed speed ratio, variable speed ratio, or stepless speed variable transmission, which is constituted by mechanical gear unit, sprocket unit, pulley unit, or linkage group; and the transmission is selectable as needed; and user interface (MI100): related to linear analog or digital, or both mixed control device, constituted by the operating mechanism, and/or the electric machine, and/or the solid state circuit, for controlling the operation of the single power source (P100), and/or controlling the operations of the continuous variable transmission (CVT100), (CVT200), (CVT300), (CVT400), (CVT500), and (CVT600).

Through the operation of the above device, if the common load body (L100) is driven for operation by the single power source (P100), and the wheel groups (W100), (W200), (W300), (W400), (W500), and (W600) installed at the load perform speed differential operation, the continuous variable transmissions (CVT100), (CVT200), (CVT300), (CVT400), (CVT500), and (CVT600) individually regulate speed ratio according to the load variation of the wheel groups (W100), (W200), (W300), (W400), (W500), and (W600) installed at the load, so as to facilitate the speed differential operation drive between the wheel groups (W100), (W200), (W300), (W400), (W500), and (W600) at the load.

In addition, for the embodiment shown in FIG. 14, except for directly driving the load through the continuous variable transmission, or through the continuous variable transmission and the transmission, a clutch unit is further installed at the output side of the continuous variable transmission CVT individually arranged, between the individual wheel group and the single power source (P100), including: the clutch unit (CL100) is additionally installed at the output side of the continuous variable transmission (CVT100), and/or the clutch unit (CL200) is additionally installed at the output side of the continuous variable transmission (CVT200), and/or the clutch unit (CL300) is additionally installed at the output side of the continuous variable transmission (CVT300), and/or the clutch unit (CL400) is additionally installed at the output side of the continuous variable transmission (CVT400), and/or the clutch unit (CL500) is additionally installed at the output side of the continuous variable transmission (CVT500), and/or the clutch unit (CL600) is additionally installed at the output side of the continuous variable transmission (CVT600), in which:

clutch units (CL100), (CL200), (CL300), (CL400), (CL500), (CL600): related to the clutch device or structure, controlled by manpower or centrifugal force, or through the control of user interface (MI100), with the function of linking transmission or cutting separation, which is driven by electricity, and/or magnetic power, and/or machine power, and/or gas pressure, and/or liquid pressure, and which has the rotary input side and the rotary output side;

stabilizing device (SDT100): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL100) and (CL200) individually driven by the continuous variable transmissions (CVT100) and (CVT200), during driving operation, if the load at individual load side varies, or if the response time of the clutch units (CL100) and (CL200) at the loads individually driven by the continuous variable transmissions (CVT100) and (CVT200) is slower, or if the clutch units (CL100) and (CL200) operate unstably because of the synchronous response time difference thereof, the stabilizing device (SDT100) installed between the loads of the clutch units (CL100) and (CL200) operates to stabilize the system;

stabilizing device (SDT200): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL300) and (CL400) individually driven by the continuous variable transmissions (CVT300) and (CVT400), during driving operation, if the load at individual load side varies, or if the response time of the clutch units (CL300) and (CL400) at the loads individually driven by the continuous variable transmissions (CVT300) and (CVT400) is slower, or if the clutch units (CL300) and (CL400) operate unstably because of the synchronous response time difference thereof, the stabilizing device (SDT200) installed between the loads of the clutch units (CL300) and (CL400) operates to stabilize the system;

stabilizing device (SDT300): constituted by the dual-end shaft coupling device with the functions of setting coupling torque and sliding damping when exceeding the torque, including the stabilizing device with dual-end shaft structure formed by fluid viscosity effect, fluid damping effect, mechanical friction effect, or electromagnetic eddy current effect or power generation anti-torque effect, in which the two revolution ends individually link between two loads of the clutch units (CL500) and (CL600) individually driven by the continuous variable transmissions (CVT500) and (CVT600), during driving operation, if the load at individual load side varies, or if the response time of the clutch units (CL500) and (CL600) at the loads individually driven by the continuous variable transmissions (CVT500) and (CVT600) is slower, or if the clutch units (CL500) and (CL600) operate unstably because of the synchronous response time difference thereof, the stabilizing device (SDT300) installed between the loads of the clutch units (CL500) and (CL600) operates to stabilize the system.

Figure 15:
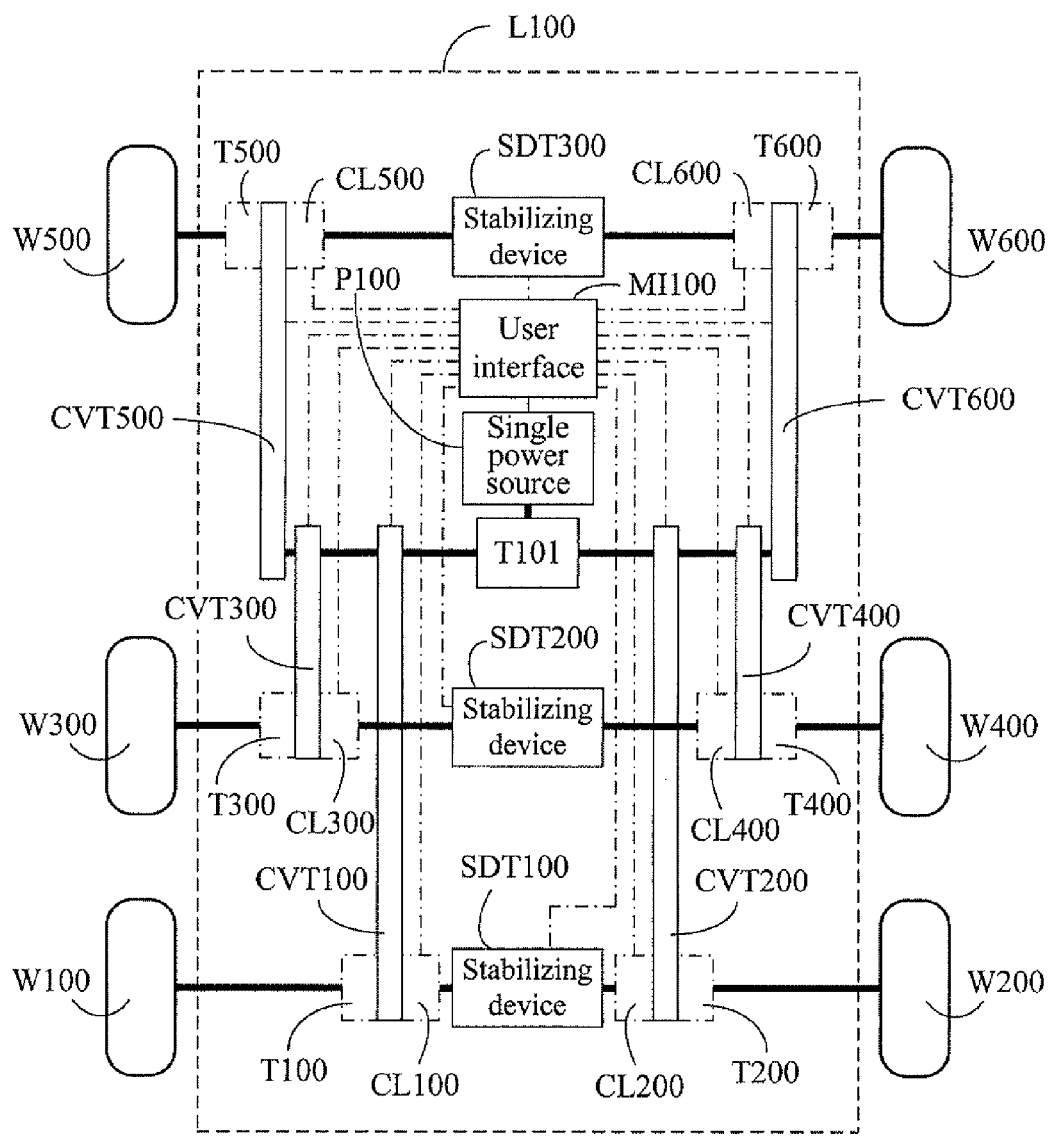
FIG. 15 is a schematic view a variation of the speed differential operation drive system shown in FIG. 14.

FIG. 15 is a schematic view showing an embodiment of the system, in which the transmission with multi-shaft output (T101) is additionally installed between the rotary output side of the single power source (P100) and the individual CVT, as shown in FIG. 14.

As shown in FIG. 15, the transmission with multi-shaft output (T101) is additionally installed between the rotary output side at single side of the single power source (P100) and the individual CVT, as shown in FIG. 14, for being driven by the single power source (P100), in which the multi-shaft output side drives the input sides of the continuous variable transmissions (CVT100), (CVT200), (CVT300), (CVT400), (CVT500), and (CVT600), respectively.

The single-powered multi-CVT differential system with stabilizing device is applied to the wheel-type vehicle, tracked vehicle, rail vehicle, or ship driven by at least two independent motors installed, or conveyor for stream of people or logistics, or industrial equipment driven by at least two motors.

The invention claimed is:

1. A single-power-source multi-CVT differential system with a stabilizing device, comprising:
    a single power source (P100);
    a first continuously variable transmission (CVT 100) and a second continuously variable transmission (CVT200) arranged to automatically change a respective speed ratio according to a load state on a respective first wheel set (W100) and second wheel set (W200), each said continuously variable transmission having a first end connected to receive power from the single power source;
    a stabilizing device (SDT100) having dual end shafts connected to a respective second end of the first continuously variable transmission (CVT100) and the second continuously variable transmission (CVT200) or between driven load sides, said stabilizing device setting a coupling torque and providing a sliding damping effect caused by fluid viscosity, fluid damping, mechanical friction, or electromagnet eddy current damping when the set coupling torque is exceeded to stabilize the differential system in case of unstable operation caused by varied loads at individual load sides during driving operation; and
    at least one of a first transmission (T100), a second transmission (T200), and both the first transmission (T100) and the second transmission (T200);
    wherein when said differential system is provided with the first transmission (T100), said first wheel set (W100) includes at least one first wheel and is connected to be driven by the second end of the first continuously variable transmission (CVT100) or to receive power from the first transmission (T100);
    wherein when said differential system is provided with the second transmission (T200), said second wheel set (W200) includes at least one second wheel and is connected be driven by the second end of the second continuously variable transmission (CVT200), or to receive power from the second transmission (T200);
    wherein when said differential system is provided with both the first transmission (T100) and the second transmission (T200), said first transmission (T100) is connected to receive power from the second end of the first continuously variable transmission (CVT100) and said second transmission (T200) is connected to receive power from the second end of the second continuously variable transmission (CVT200); and wherein the first and second continuously variable transmissions (CVT100, CVT200) differentially transmit power from the single power source (P100) to the individual wheel sets (W100, W200) to drive the individual wheel sets at different speeds according to the respective load state of each of the individual wheel sets.

2. A single-power-source multi-CVT differential system with stabilizing device as claimed in claim 1, wherein said single power source (P100) has a rotary output connected to the first and second continuously variable transmissions (CVT100, CVT200) and includes at least one of: (a) an internal combustion engine, (b) external combustion engine, (c) spring-driven power source, (d) hydraulic power source, (e) pneumatic power source, (f) flywheel power source, (g) manual power source, and (h) AC or DC, brushless or brushed, synchronous or non-synchronous electrical power source.

3. A single-power-source multi-CVT differential system with stabilizing device as claimed in claim 1, wherein the first and second continuously variable transmissions (CVT100, CVT200) each include one of: (a) a non-coaxial continuously variable transmission having a rubber belt, metal belt, or chain, (b) an electronic continuously variable transmission (ECVT), and (c) a friction disc continuously variable transmission.

4. A single-power-source multi-CVT differential system with stabilizing device as claimed in claim 1, wherein said first and second transmissions include at least one of: (a) a mechanical gear unit, (b) sprocket unit, (c) pulley unit, and (d) linkage group to form a fixed speed ratio transmission or stepless speed variable transmission.

5. A single-power-source multi-CVT differential system with stabilizing device as claimed in claim 1, further comprising a user interface (MI100) for controlling operations of at least one of the single power source (P100), the first continuously variable transmission (CVT100), and the second continuously variable transmission (CVT200).

6. A single-power-source multi-CVT differential system with stabilizing device as claimed in claim 1, further comprising first and second clutch units (CL100, CL200) installed between the stabilizing device (SDT100) and respective said second ends of the first and second continuously variable transmissions (CVT100, CVT200) or respective said driven load sides, said first and second clutch units being controlled manually or by centrifugal force to selectively couple the stabilizing device (SDT100) to at least one of the continuously variable transmissions (CVT100, CVT200) when the individual load states vary or a synchronous response time difference exists between loads on respective sides of the stabilizing device.

7. A single-power-source multi-CVT differential system with stabilizing device as claimed in claim 6, wherein the first and second wheel sets (W100, W200) are at two sides of a common load body (L100).

8. A single-power-source multi-CVT differential system with stabilizing device as claimed in claim 1, further comprising a transmission with a multi-shaft output (T101) connected between the single power source (P100) and the respective first ends of the first and second continuously variable transmissions (CVT100, CVT200).

9. A single-power-source multi-CVT differential system with stabilizing device as claimed in claim 1, further comprising a third continuously variable transmission (CVT300) having a first end connected to receive power from the single power source (P100) and a second end connected to a third wheel set (W300) through a third transmission (T300), said third continuously variable transmission having a speed ratio regulated according to a load variation between the first, second, and third wheel sets (W100, W200, W300).

10. A single-power-source multi-CVT differential system with stabilizing device as claimed in claim 9, further comprising a clutch unit (CL300) connected between the third transmission device (T300) and the second end of the third continuously variable transmission (CVT300).

11. A single-power-source multi-CVT differential system with stabilizing device as claimed in claim 9, wherein said first and second wheel sets (W100, W200) are at one end of a common load body (L100), and said third wheel set (W300) is at a second end of the common load body (L100).

12. A single-power-source multi-CVT differential system with stabilizing device as claimed in claim 9, further comprising first, second, and third clutch units (CL100, CL200, CL300), said first and second clutch units (CL100, CL200) installed between the stabilizing device (SDT100) and respective said second ends of the first and second continuously variable transmissions (CVT100, CVT200) or respective said driven load sides, said first and second clutch units being controlled manually or by centrifugal force to selectively couple the stabilizing device (SDT100) to at least one of the first and second continuously variable transmissions (CVT100, CVT200) when the individual load states vary or a synchronous response time difference exists between loads on respective sides of the stabilizing device, and said third clutch unit (CL300) being manually controlled or controlled by centrifugal force and installed between third transmission (T300) and the second end of the third continuously variable transmission (CVT300).

13. A single-power-source multi-CVT differential system with stabilizing device as claimed in claim 12, wherein said first, second, and third clutch devices (CL100, CL200, CL300) each include a rotary input side and a rotary output side, and are each operated by one of electrical power, magnetic power, machine power, gas pressure, and liquid pressure.

14. A single-power-source multi-CVT differential system with stabilizing device as claimed in claim 9, further comprising a multi-shaft transmission (T101) connected between the single power source (P100) and respective first ends of the first, second, and third continuously variable transmissions (CVT100, CVT200, and CVT300).

15. A single-power-source multi-CVT differential system with stabilizing device as claimed in claim 1, further comprising:
a third continuously variable transmission (CVT300) having a first end connected to receive power from the single power source (P100) and a second end connected to a third wheel set (W300) through a third transmission (T300), and a fourth continuously variable transmission having a first end connected to receive power from the single power source (P100) and a second end connected to a fourth wheel set (W400) through a fourth transmission (T400), said third and fourth continuously variable transmissions (CVT300, CVT400) each having a speed ratio regulated according to a load variation between the first, second, third, and fourth wheel sets (W100, W200, W300, W400); and
a second stabilizing device (SDT200) having dual end shafts connected to a respective second end of the third continuously variable transmission (CVT300) and the fourth continuously variable transmission (CVT400) or between respective driven load sides, said second stabilizing device setting a coupling torque between the second ends of the third and fourth continuously variable transmissions (CVT300, CVT400) and providing a sliding damping effect caused by fluid viscosity, fluid damping, mechanical friction, or electromagnet eddy current damping when the set coupling torque is exceeded to stabilize the differential system in case of unstable operation caused by varied loads on said third and fourth wheel sets (W300, W400) during driving operation.

16. A single-power-source multi-CVT differential system with stabilizing device as claimed in claim 15, further comprising third and fourth clutch units (CL300, CL400) connected between both ends of the second stabilizing device (SDT200) and respective output ends of the third and fourth continuously variable transmissions (CVT300, CVT400) or the driven load sides of the respective output ends of the third and fourth continuously variable transmissions (CVT300, CVT400).

17. A single-power-source multi-CVT differential system with stabilizing device as claimed in claim 15, wherein said first and second wheel sets (W100, W200) are at one end of a common load body (L100), and said third and fourth wheel sets (W300, W400) are at a second end of the common load body (L100).

18. A single-power-source multi-CVT differential system with stabilizing device as claimed in claim 15, further comprising first, second, third, and fourth clutch units (CL100, CL200, CL300, CL400), said first and second clutch units (CL100, CL200) installed between the first stabilizing device (SDT100) and respective said second ends of the first and second continuously variable transmissions (CVT100, CVT200) or the respective driven load sides, and said third and fourth clutch units (CL300, CL400) installed between the second stabilizing device (SDT200) and respective said second ends of the third and fourth continuously variable transmissions (CVT300, CVT400) or the respective driven load sides, said first, second, third, and fourth clutch units being controlled manually or by centrifugal force to selectively couple the respective first and second stabilizing devices (SDT100, SDT200) to at least one of the continuously variable transmissions (CVT100, CVT200, CVT300, CVT400) when the individual load states vary or a synchronous response time difference exists between loads on respective sides of the stabilizing device.

19. A single-power-source multi-CVT differential system with stabilizing device as claimed in claim 18, wherein said first, second, third, and fourth clutch devices (CL100, CL200, CL300, CL400) each include a rotary input side and a rotary output side, and are each operated by one of electrical power, magnetic power, machine power, gas pressure, and liquid pressure.

20. A single-power-source multi-CVT differential system with stabilizing device as claimed in claim 18, further comprising a multi-shaft transmission (T101) connected between the single power source (P100) and respective first ends of the first, second, third, and fourth continuously variable transmissions (CVT100, CVT200, CVT300, and CVT400).

* * * * *